United States Patent [19]

McTamaney

[11] Patent Number: 4,491,829

[45] Date of Patent: Jan. 1, 1985

[54] DISPLAYING ARTICLE CONFIGURATION DATA

[75] Inventor: Louis S. McTamaney, Cupertino, Calif.

[73] Assignee: The Salk Institute for Biological Studies, San Diego, Calif.

[21] Appl. No.: 340,583

[22] Filed: Jan. 18, 1982

[51] Int. Cl.³ .......................... G06F 15/20; G01C 3/00

[52] U.S. Cl. .................................... 364/562; 340/753; 33/1 L

[58] Field of Search ............... 364/560, 562, 171, 188, 364/146, 469; 33/1 L; 340/753, 754, 709

[56] References Cited

U.S. PATENT DOCUMENTS

| | | | |
|---|---|---|---|
| 3,882,446 | 5/1975 | Brittian et al. | 340/706 X |
| 3,895,356 | 7/1975 | Kraus | 364/556 X |
| 4,050,308 | 9/1977 | Lee | 340/753 |
| 4,158,229 | 6/1979 | Woo, Jr. et al. | 364/562 |
| 4,242,980 | 1/1981 | Go | 364/561 X |
| 4,247,768 | 1/1981 | Elmer et al. | 364/562 |
| 4,257,107 | 3/1981 | Heymsfield | 364/562 X |
| 4,282,571 | 8/1981 | Giovannoli | 364/562 |

*Primary Examiner*—Edward J. Wise
*Attorney, Agent, or Firm*—Fitch, Even, Tabin & Flannery

[57] ABSTRACT

This is a display and control system which includes a computer and peripheral hardware for displaying deck board position data and deck board width data on both the upper and lower sides of a pallet. The system includes a row of light emitting diode cells for displaying deck board position and width for each side of a pallet and a manually controllable cursor cell which can be set at a selected deck board position along a row. Data entry controls are provided for supplying data to the computer for energizing display cells adjacent the cursor cell to represent both pallet deck board width and board position in each row and the computer stores the data to control a pallet nailing machine.

19 Claims, 26 Drawing Figures

THUMBWHEEL SWITCHES
DECK BOARD WIDTH "A"
DECK BOARD WIDTH "B"
INCHES
1/2 INCHES
TWA
TWB
DA
DB
WA-1
WA1/2
WB-1
WB-1/2
ENTER THUMBWHEEL DATA
ETW
SELECT "A"
SELECT "B"
SELECTIVE CLEAR
SA
SB
SC
SET DECK BOARD LOCATION
CP
CURSOR POSITION
DECK SELECT S-U/L
UPPER
LOWER
CU
CL
P
PA
S
M

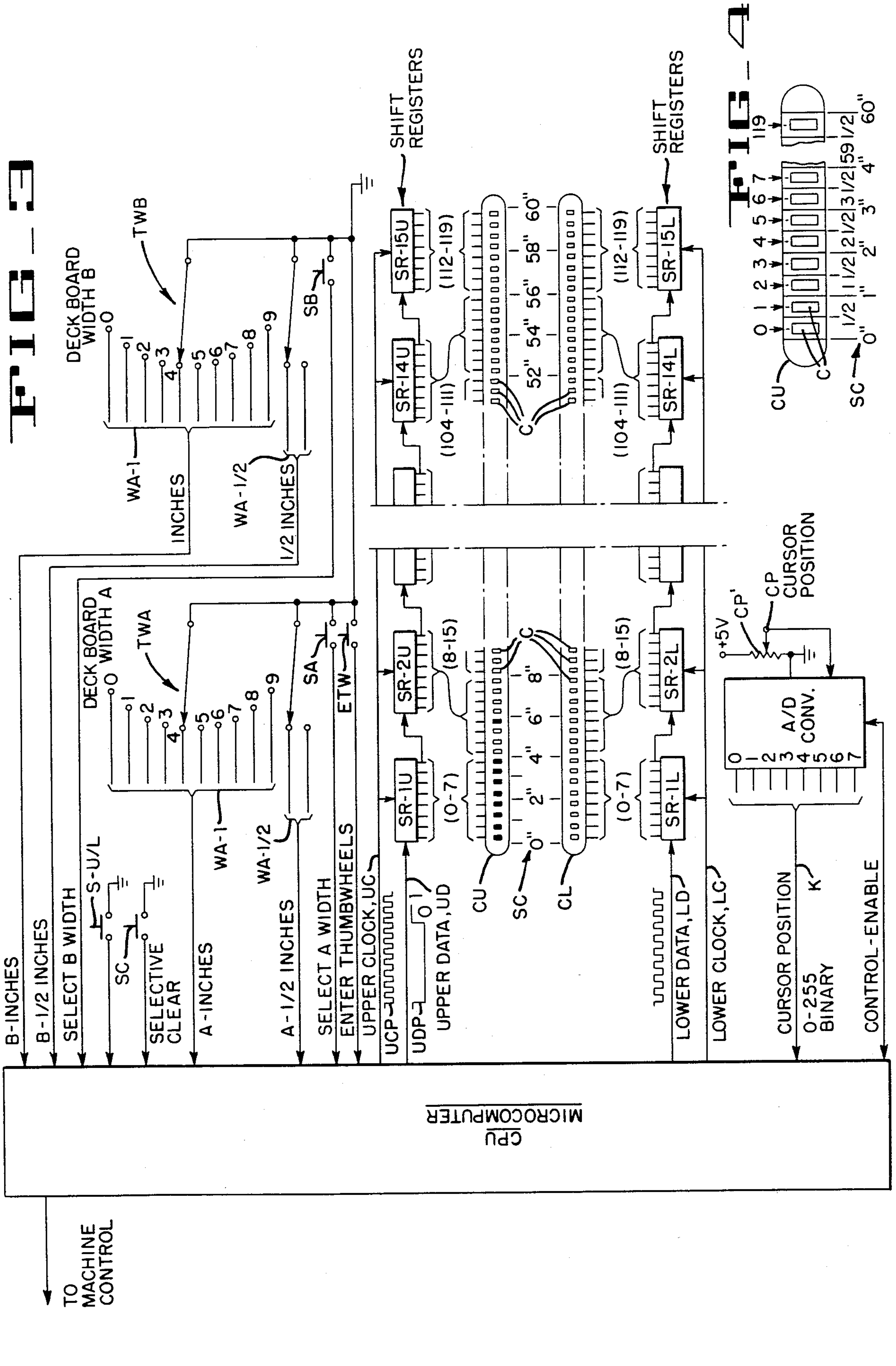
FIG-3
FIG-4
DECK BOARD WIDTH B
TWB
0
1
2
3
4
5
6
7
8
9
WA-1
INCHES
WA-1/2
1/2 INCHES
SB
SHIFT REGISTERS
SR-15U
SR-14U
(112-119)
(104-111)
52" 54" 56" 58" 60"
C
SR-15L
SR-14L
DECK BOARD WIDTH A
TWA
SA
ETW
SR-2U
SR-1U
(8-15)
(0-7)
0" 2" 4" 6" 8"
SR-2L
SR-1L
CU
SC
CL
+5V
CP'
CP
CURSOR POSITION
A/D CONV.
0 1 2 3 4 5 6 7
K
119
1/2 1" 1 1/2 2" 2 1/2 3" 3 1/2 4" 59 1/2 60"
B-INCHES
B-1/2 INCHES
SELECT B WIDTH
S-U/L
SC
SELECTIVE CLEAR
A-INCHES
A-1/2 INCHES
SELECT A WIDTH
ENTER THUMBWHEELS
UPPER CLOCK, UC
UCP
UDP
UPPER DATA, UD
LOWER DATA, LD
LOWER CLOCK, LC
CURSOR POSITION
0-255 BINARY
CONTROL-ENABLE
CPU
MICROCOMPUTER
TO MACHINE CONTROL

DISPLAYING ARTICLE CONFIGURATION DATA

BACKGROUND OF THE INVENTION

Field of the Invention

This invention relates to the display of article configuration data and more particularly to the display of data which represent the configuration of an article of manufacture, such as the size and location of the deck boards on pallet stringers. The data can be used to control the operation of an article manufacturing machine, such as a pallet nailing machine.

SUMMARY OF THE INVENTION

The article configuration display system of the present invention presents a visual display of the desired configuration of an article to be manufactured or assembled and stores control data that can be employed by an electrically controlled machine for the manufacture of the article in accordance with its displayed configuration.

Basically, the display system includes a row of electric display cells with each cell representing a fractional length of the row and includes means for selectively lighting spaced groups of cells in the row for representing both article positions and article widths at those positions along the row.

The system is initially programmed by an article position control and by the introduction of article configuration data inputs. The results of the programming operation are visually presented by the selective illumination of individual visual display cells which are members of a row or array of cells. After completion of the programming of the system, the display units which are illuminated represent the selected configuration of an article of manufacture.

As the visual display is established, the article configuration data signals are stored for controlling a machine designed to manufacture an article corresponding to the displayed configuration. The present invention relates to the article configuration display and signal storage system and not to the details of the machine which is controlled by the system.

In the embodiment of the invention to be described in detail, the system is designed for controlling the operation of an automatic pallet nailing machine which nails boards of selected widths at selected locations along the upper and lower sides of pallet stringers. Such a machine is disclosed in the copending application of Billett et al, Ser. No. 236,426, filed Feb. 20, 1981, now U.S. Pat. No. 4,392,600, and assigned to the FMC Corporation. However, it is contemplated that the display system of the present invention can be employed to display the desired configuration of various other articles of manufacture or the like, as well as to supply control data for associated article manufacture or assembly machines.

In the preferred embodiment of the invention to be described, each individual display unit or cell is a light emitting diode (LED) but other display units such as liquid crystals or even small incandescent lamps could be employed within the scope of the present invention.

In the embodiment of the invention to be described, the system is programmed by the introduction of three basic forms of data during the programming operation. These data are: selection of the upper or lower decks of the pallet stringers; the position of the deck boards on either deck and the individual deck board widths. In the preferred embodiment, the aforesaid data are manually introduced by an operator, although it is contemplated that the data could be introduced by remote control, as by punched cards, recorded tapes, or the like.

In the preferred, manually controlled system to be described, a microcomputer or central processing unit (CPU) receives and stores data and performs the usual logic and decision making functions. The data is introduced and displayed by peripheral hardware.

A "Deck Select" push button selects whether data for the upper or the lower deck of the stringers is being entered. Available or designated deck board width data are introduced by the manual setting of multicontact switches, the selected outputs of which are converted into corresponding binary members for storage by the computer.

Deck board position is set in by setting the location of a position control. As the operator moves the aforesaid position control, a lighted cell moves along the array of cells in response to the control and hence the lighted cell acts as a position indicator in the array. For convenience, the position indicator cell which is thus illuminated will be referred to as a "cursor".

The operator adjusts the cursor position control until the cursor is at a selected position along a previously selected row of cells, representing either the upper deck or the lower deck of the pallet stringers. The cursor is then left in a selected position which represents the position of one edge of a deck board. Next, the width of a pallet deck board is selected and that width is entered into the microcomputer, whereupon a short row of cells in the array is illuminated in the selected deck array, starting from the cursor position. The length of the row can be read against a graduated scale which provides a visual indication of both deck board position and deck board width along the pallet stringers.

These operations are continued until a complete set of deck boards is displayed in the array along both decks. The display now visually presents the configuration of the entire pallet and the displayed configuration is stored in the computer as data for control of a pallet nailing machine, in the embodiment being described.

In the display system of the preferred embodiment of the present invention, two rows of display cells in the form of LED's are energized by companion, serial input, parallel output shift register hardware assemblies, based on data transferred from the CPU.

If the article configuration cells remained lit during cursor motion, they would mask the position of the cursor, making control thereof difficult. Masking is prevented by the CPU, which automatically darkens all previously lit article configuration cells while the cursor is being shifted by the operator to a new position in the array of cells. When the cursor is stationary at a new position the CPU re-directs the previously entered article configuration data to the display cells along with the new cursor position.

Thus, the same array of cells is employed for displaying both the article configuration and the cursor position. This super-positioning of article configuration displays and cursor position display not only obviates the need for two arrays for a single deck—one for displaying article configurations and one for cursor position—it virtually eliminates the possibility of errors by an operator in his comparison of cursor position with the desired article configuration displayed.

In order to obtain this action while storing previously entered article configuration data for display, the CPU contains individual deck storage RAM registers for storing configuration data while the cursor is being shifted and also employs a "Virtual" or transfer register. The virtual register is the register which is actually connected to the display cell shift registers. When article configuration data plus the last position of the cursor are to be displayed, the virtual register relays data stored in the selected deck register to the selected display, upper or lower. When cursor position only is to be displayed, the virtual register relays cursor position only from a CPU logic circuit to the display.

Each storage (deck) register is selectively enabled by the CPU for transfer of its stored data to the virtual register and it is the data in the latter which is transferred to the peripheral shift registers for lighting the display cells. However, the article position and configuration data remain stored in the deck storage registers when cursor position data only is introduced to the virtual register (which controls the peripheral hardware), as previously described.

During the introduction of new article configuration and position data into the CPU, using the cursor and the data display array, the operator may selectively clear some or all of previously entered data from a selected deck storage register in the CPU and hence from the display. The data is cleared in positions in the array adjacent to and to one side of (e.g., to the left side) of the cursor.

When a "Selective Clear" button is depressed, the CPU examines, cell by cell, the conditions of the cells to the left (e.g.) of the last cursor position until it locates the first unlit cell. The CPU then clears or darkens all succeeding cells to the end of the array. The cell representing last cursor position is then relit and the operator can proceed to complete his data entry by manipulating an unobscured cursor.

BRIEF DESCRIPTION OF THE DRAWINGS

FIG. 3 is a schematic diagram of the data entry and display components.

FIG. 4 is a fragmentary enlarged diagram of the upper display array.

DETAILED DESCRIPTION

In the embodiment of the invention disclosed, many operations such as logic, selection, control, clock and data storage-recall operations are carried out by a microcomputer or central processing unit (CPU). Operations are carried out in response to a program for the CPU. In order to illustrate the principles of operation, the significant programmed operations are presented by block diagrams and appropriate legends, as are random access data storage registers or memories (RAMS) which are incorporated in the CPU. These block diagrams are connected by operational and data flow arrows. Enough information is thus presented to enable a computer programmer, having ordinary skill in the art, to write a program which will provide the intended mode of operation of the system.

The preferred embodiment of the invention disclosed herein is a system for use in connection with the pallet nailing mach:ne of the aforesaid Billett et al application Ser. No. 236,462 filed Feb. 20, 1981, now U.S. Pat. No. 4,392,600, and assigned to the FMC Corporation, the disclosure of which is incorporated herein by reference. However, in the broader aspects of the invention it is contemplated that the display and control operations of the present invention can be used in connection with the construction of articles of manufacture having other configurations.

CONTROL PANEL

Figures 1, 1A, 2:
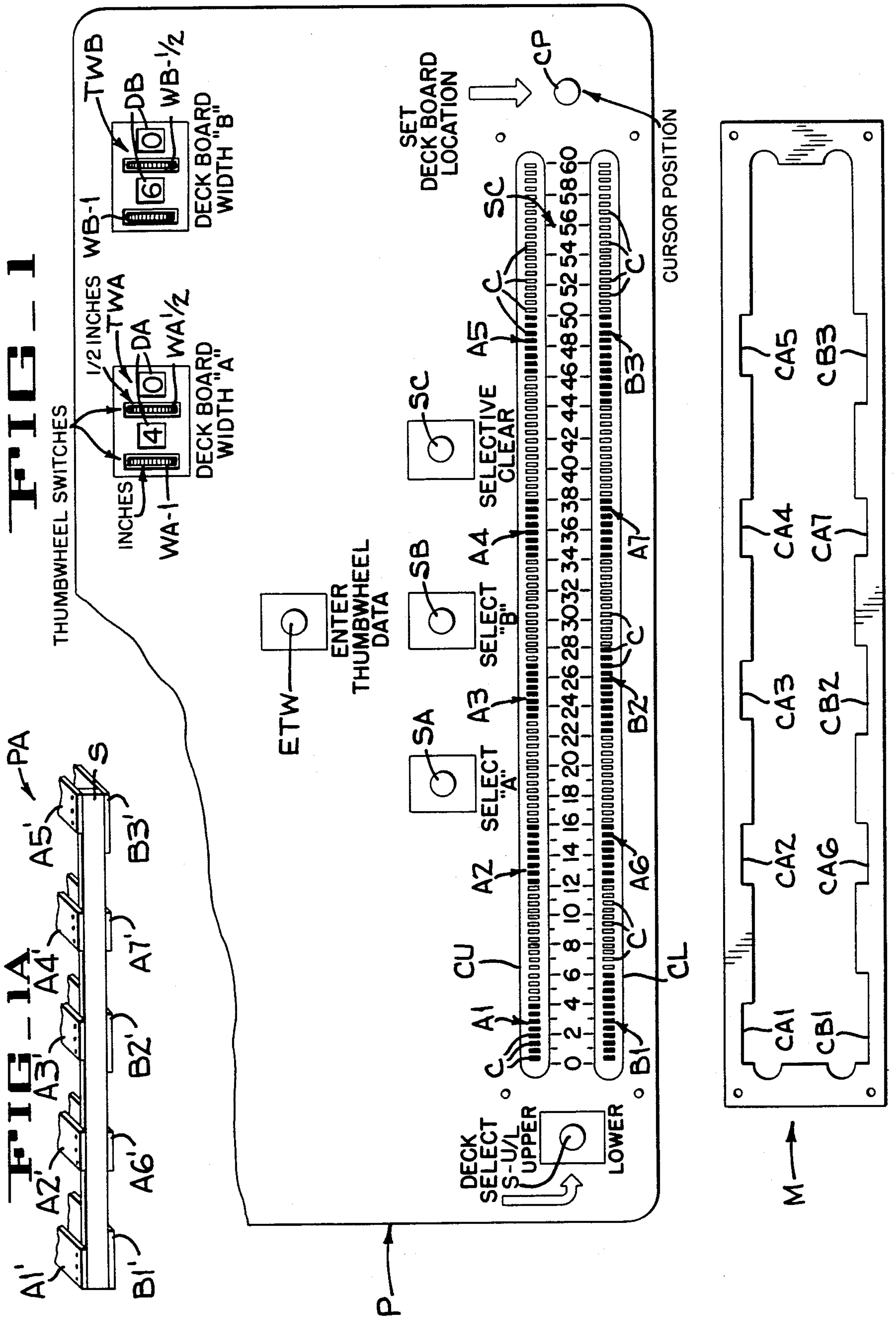
FIG. 1 is a view of the data entry and display panel.
FIG. 1A is a fragmentary perspective of a pallet representing the article configuration data.
FIG. 2 shows a data entry pattern mask.

The control and display panel P of the present invention is shown in FIG. 1 and displays the configuration of pallet PA shown in FIG. 1A. The panel has a number of functions. It provides for the introduction of two predetermined or "designated" deck board widths in a memory of the microcomputer or CPU; provides for selecting deck board positions; provides for the entry of selected board widths at selected deck board positions in either the upper or the lower deck of the pallet; displays the selected configuration of the upper and lower decks of the pallet and provides for selectively clearing previously entered data.

Turning first to the panel display, the display is formed by two arrays or rows of individually electrically energizeable cells C, each cell being a light emitting diode (LED). An upper row CU of cells can be energized to represent selected deck board configuration data for the upper deck of the pallet and the lower row CL of cells display the corresponding selected configuration data for the lower deck. The cells CU are energized by data signals from the microcomputer CPU, as will be explained. In the form shown, the maximum pallet stringer length is 60 inches, as indicated by an Inch Scale SC between the rows CU and CL of cells. Each cell C represents ½ inch, hence there are 120 cells in each row, to be referred to as cells numbered 0-119.

A "Deck Select" switch S-U/L is provided for selecting either the upper deck array CU or the lower deck array CL for entering deck board position and position data.

In the embodiment being described, the pallet nailing machine to be controlled by the system has hoppers for two designated deck board widths, an "A" width and a "B" width. Deck Board width data are stored in CPU machine control registers and are displayed at the selected deck in four steps. In the first step, the designated board widths are set up at the control panel. In the second step the designated widths are entered into deck width memories in the CPU. In the third step board position along the selected deck is determined by setting a cursor. In the fourth step, a designated board width is selected and transferred from a deck width memory to a deck data storage register in the CPU and is simultaneously displayed at the cursor position.

In the embodiment illustrated for the first step, thumbwheels are provided for setting up designated deck board widths, width "A" and width "B". These thumbwheels are provided with visual inch numbers. Deck board width "A" is chosen by operating thumbwheels TWA which can set up board widths in ½ inch increments up to 9½ inches. The thumbwheel WA-1 operates a switch and sets up data for board widths "A" in 1 inch increments whereas a thumbwheel WA-½ sets up data for widths in ½ inch increments. The board width "A" set up also appears in a digital display DA based on position of the thumbwheel. The companion thumbwheels unit TWB sets up deck board width "B" and has a 1 inch thumb wheel WB-1, a one-half inch thumbwheel WB-½ and a display DB. In the example given, the operator has designated a board width "A" of 4 inches and a width "B" of 6 inches.

As the second step, the designated widths "A" and "B" are entered into their respective board width memories in the CPU memory by operation of an "Enter Thumbwheels" switch ETW. Now, either board width is selectively available from computer deck width memory, but as yet, no board width data will appear in the display arrays CU and CL.

In the third step, deck board position along the selected deck is set into the deck data registers in the CPU and is displayed by lighting a single cell C at any operator controlled position along the deck array CU or CL selected by "Deck Select" switch S-U/L. The position cell thus illuminated has been referred to as the "cursor". The position of the cursor is controlled by operation of a cursor control potentiometer knob CP, shown at the right of the two arrays in FIG. 2. Before setting up a display, the cursor control will have been operated to set the cursor at the zero position. When the cursor is shifted to a selected position along the scale and left there, the system is readied for the fourth step. The operator can select board width "A" from computer board width memory for storage in article configuration deck registers within the CPU and for display. Board width "A" is selected by means of a "Select A" switch SA. A board width "B" can be similarly selected by a "Select B" switch SB.

When switch SA is operated, a group of cells C is illuminated along the selected deck array CU or CL at the cursor. Since board width "A" is 4 inches in the example shown, and since each cell represents ½ inch, the group will contain 8 cells, numbered 0–7. Upon operation of switch SA, the cursor cell (previously lit) remains lit and the next seven cells in the row will be lit, the eight illuminated cells thereby representing both the position and width of a four inch deck board.

A sample pallet configutation display for the upper and lower decks CU and CL appears in FIG. 1 for a pallet stringer length of 50 inches. To summarize, this display would be set up as follows: The operator selects the deck to be entered by use of the "Deck Select" switch S-U/L which, in effect, is a toggle switch. The thumbwheels TWA and TWB will have been set up as the aforesaid first step in deck board entry and the thumbwheel set ups will have been entered into the CPU by switch ETW in the aforesaid second step.

Assuming that the data for the upper array CU has been selected, the operator will operate the cursor position control knob CP until the cursor cell is at the 0 inch position, as the aforesaid third step. Only the cursor cell will be illuminated. The first deck board is to be a four inch board and hence the operator closes the "Select A" switch SA. A row of 8 cells (including the cursor cell) will be now illuminated, thereby indicating both the position and the width of the first deck board A1. The operator then moves the cursor to 12 inches on the inches scale SC and closes the SA switch again, thereby illuminating a row of 8 cells representing a second 4 inch deck board A2, located 12 inches from the starting edge of the pallet. In the configuration shown, all of the five deck boards on the upper deck array CU are to be 4 inch boards (A width) and hence the aforesaid board position and board width data entry operations are performed with the cursor at 21 inches on the inch scale SC, at 34 inches and at 46 inches.

After the complete upper deck board configuration has thus been entered and displayed the "Deck Select" switch S-U/L is again operated for the entry and display of data for the lower deck array CL. The cursor is again moved to the 0 inch position on the inches scale and the first deck board width B1 is entered, which in this example is a 6 inch board. With the cursor at 0 the operator operates the "Select B" switch SB and 12 cells C will be illuminated as group B1, representing a 6 inch board at the left end of the pallet. The operator now moves the cursor cell to the 12 inch position on the inches scale and enters a 4 inch board by operating the "Select A" switch SA, whereby a group A6 of 8 cells is illuminated. The operator next moves the cursor to the 22 inch position on the scale and enters a 6 inch board by operation of the "Select B" switch SB, illuminating a group B2 of 12 cells. Next, a 4 inch board indicated by a group A7 of 8 cells is entered and last, a 6 inch board indicated by a group B3 of 12 cells B3 is entered and displayed as shown in FIG. 1.

In the description just given, a mode of operation wherein all of the data for one deck is entered before entry of any data for the other deck. It is not necessary to follow this procedure. By repeated operation of the "Deck Select" switch S-U/L the data for the upper and lower decks can be progressively and alternately entered working from left to right; e.g., upper-lower, upper-lower, lower-upper, etc.

As will be seen, the data displayed on the display panel is also stored in deck registers or memories in the CPU control of a pallet nailing machine. A pallet PA which would be manufactured from the data displayed is shown in FIG. 1A.

The system of the present invention provides a "Selective Clear" function which enables the operator to correct data entry errors made in the vicinity of the cursor. Also, the display of an entire deck can be cleared when the cursor is at zero inches. Clearing is provided by the "Selective Clear" switch SC, closure of which darkens all previously illuminated cells in the vicinity of the cursor and to the right of the cursor, as well as clearing the deck registers in the CPU of the same data. The Selective Clear switch enables the operator to re-enter data which was previously entered erroneously without clearing correctly entered data.

FIG. 2 shows a template or mask M which can be placed over the two rows of display cells CU and CL in order to facilitate entry of deck board width and position data by the operator. In order to enter deck board data illustrated in FIG. 1 the mask M will have upper cutouts CA1–CA5 custom formed in the mask to represent the positions of the deck boards A1–A5 for the upper deck. Cutouts CB1, CA6, CB2, etc. are also provided for indicating the positions and widths of the deck boards along the lower array CL.

DATA ENTRY AND DISPLAY DETAILS

FIG. 3 is a schematic diagram illustrating additional details of the data entry and display system for the microcomputer or CPU. In the system to be described, the CPU operates on so called "negative logic" in that a voltage low or "0" represents an active, energized or enabled signal whereas a voltage high (such as +5 volts) or "1" represents an off or de-energized signal. The CPU is represented as a blank block and the Deck Select switch S-U/L is illustrated near the top of the block. One side of the switch is grounded and when the switch is sequentially depressed it operates a toggle switch or flip-flop within the CPU to activate the register and display system for the selected deck, either CU or CL. The Selective Clear switch SC is shown just below the Deck Select switch.

The thumbwheels switch TWA for designating deck board width "A" includes a 1 inch and a ½ inch thumbwheel. The thumbwheel WA-1, which designates board width in inches, is a multi-tap switch having a grounded contactor and switch points 0–9 for representing a board width up to 9 inches. The thumbwheel switch WA-½ is a two contact switch having outputs of 0 and 1 representing respectively 0 and ½ inches of board width. Maximum board width designation is 9½". Outputs of the thumbwheel switches individually enter the CPU but their outputs are bracketed for convenience of illustration in FIG. 3. The connection for the thumbwheels switch TWB for selecting deck board width "B" are like those for TWA and need not be described in detail.

In accordance with known techniques, the signals from thumbwheel units TWA and TWB are interfaced to the microcomputer via conventional decoder/encoder circuits which convert the switch positions into binary format in the usual manner. For clarity of illustration the decoder/encoder circuit loops have not been shown because they merely represent conventional practice. These circuits are connected to the computer input/output ports.

After the thumbwheels of both deck board width selection assemblies TWA and TWB have been set, the designated board width data from each thumbwheel assembly are separately stored in computer board width memories by depressing the "Enter Thumbwheel" switch ETW. When the switch ETW is operated, deck board width "A" and deck board width "B" designations are entered into respective deck board width memory circuits within the CPU. When it is desired to transfer either deck board width "A" or deck board width "B" to the deck registers of the CPU for display and control, either the "Select A" switch SA or the "Select B" switch SB is closed, whereupon the selected board width is transferred from board width memories to deck registers within the CPU for display and control.

Shift Registers And Display

As to the display and referring still to FIG. 3, the cells C of the upper row CU of display cells are each connected to an output of a series connected group of serial input, parallel output shift registers and the cells of the lower row CL are similarly connected to a similar row of shift registers.

For illuminating the cells of the upper row CU, 15 8-bit output shift registers SR-1U, SR-2U-SR-14U and SR-15U are provided. Display data from the CPU are directed to the input of the first shift register SR-1U by an upper data line UD and the 8 parallel outputs of the shift register SR-1U are numbered 0–7, which outputs are connected to the first 8 cells C of the upper display array CU. The remaining shift registers for the upper row of cells are connected in the same manner and a transfer connection is made from the last parallel output of one shift register to the input of the succeeding shift register, in accordance with conventional serial shift register connection practice. As data bits are serially introduced into each shift register, the data bits are shifted or stepped along by pulses UCP on an upper clock line UC leading from the CPU. The nature of the data, either 0 or 1, is determined by the level of upper data pulses UDP from the CPU on the upper data line UD. This circuit provides for the lighting of 120 cells C in an array, which cells will be numbered cells 0–119 in accordance with conventional practice in this art.

The lower row CL of display cells numbered 0–119 is connected to a series of shift registers SR-1L to SR-15L in a similar manner and the inputs to the shift registers as well as their parallel output connections are functional duplicates of those described in connection with the upper display CU.

Board width and position data for each row of shift registers enter the first register SR-1U and are passed on through the registers as a serial string of data bits entering in inverse order, e.g., cells No. 119, 118-1, 0. The corresponding parallel outputs of the individual shift registers are set from this data to either a condition 1 or to a condition 0, the latter energizing the associated display cell C. For example, in FIG. 3 a long data pulse UDP is illustrated below the upper data line UD. The voltage is low or at "0" for a period of time representing 8 clock pulses UCP, so that the data pulse UDP will light 8 cells C, depending on its position in the entire 0–119 data bit number. Each clock pulse UCP advances the string of data bits entering the shift registers by one bit number until the entire string of shift registers is filled, that is until the pulse corresponding to the highest data bit number (119) has been passed through to the last output terminal of the last shift register, such as SR-15U for the upper display.

Cursor System

Still referring to FIG. 3, the cursor system enables the operator to visually select individual board positions. The cursor system includes a cursor potentiometer CP' controlled by the knob CP on the panel, previously described in connection with FIG. 1. One end of the potentiometer is connected to a voltage supply such as +5 V and the other end is grounded. The potentiometer slider forms an input to an A/D converter which converts the voltage inputs into a cursor position binary number, which in the example being described will be from 0–255. The A/D converter has 8 outputs numbered 0–7. The number of each output, in accordance with conventional practice, represents the corresponding power of 2 when the output is energized. For example, when the 0 output of the A/D converter is energized, its output is a 1 corresponding to $2^0$. An output from terminal 1 of the A/D converter is $2^1$ or the number 2. The output terminal number 7 represents the number $2^7$ or the number 128. The sum total available binary cursory position numbers represent the numbers 0–255, more than twice the 120 actual cursor position numbers required by each display. The A/D output number is divided by 2 in order to augment the precision of the control potentiometer. The outputs from the A/D converter enter the CPU individually but are shown bracketed for convenience in FIG. 3, entering as a single cable K. A conventional Control Enable connection for the A/D converter is also provided between the CPU and the converter.

DISPLAY CELL POSITIONS

FIG. 4 is a fragmentary diagram of the upper deck display array CU showing the positions of the individual cells C relative to the inch markings on the scale SC. In FIG. 4 the connection to cells No. 0–7 and 119 are illustrated. When only cell No. 0 is lit, it provides an indication of a board width of 0–½ inches or a board position at 0 on the inches scale, depending upon whether board width or cursor position is being considered. When the 8 cells Nos. 0–7 are lit, they indicate a board width of 4 inches in ½ inch increments on the scale SC.

BASIC FUNCTIONS OF MICROCOMPUTER

Figure 5:
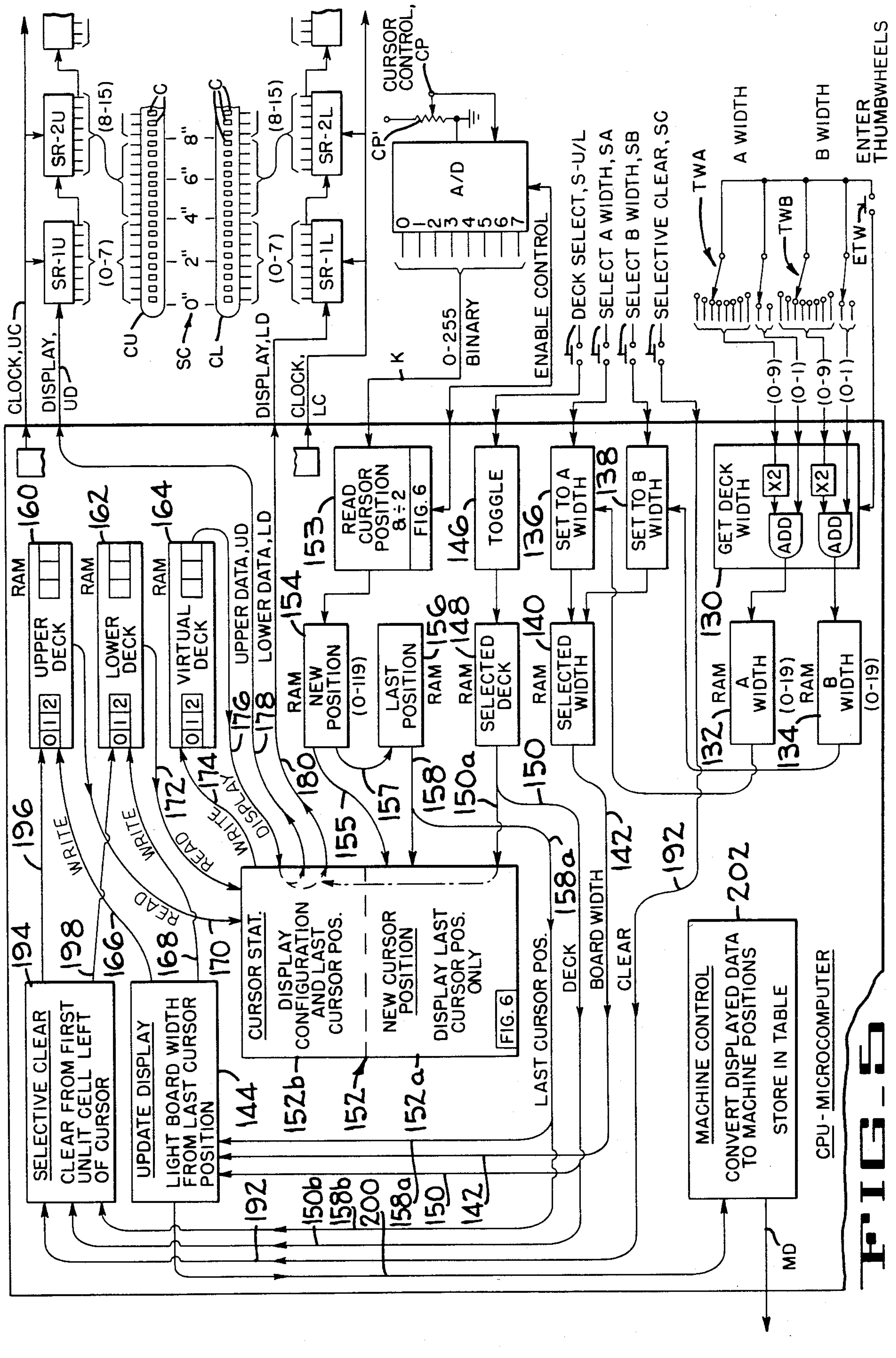
FIG. 5 is a schematic block diagram of the central processing unit and the data entry display components.

The basic functions of the microcomputer CPU are shown schematically by the use of block diagrams and flow arrows in FIG. 5. Various data inputs and display outputs previously described also appear in the diagram and need not be described in detail.

Board Width Data

Designated board width data from the thumbwheel assemblies TWA and TWB enter a "Get Deck Width" circuit indicated as a block 130. The deck board width selections in inches (0–9) are multiplied by 2 and added to the deck board width selection in half inches (0–1). The resultant sum provides a binary number representing designated deck board width in half inches for each thumbwheel assembly. The "A" width is stored in an A width RAM 132 and the "B" width number is stored in a RAM 134. An "A" width board can be selected for display by a "Set To A Width" circuit 136 under control of the switch SA and is thereupon transferred to a "Selected Width" RAM 140 for further processing. Similarly, a "B" width can be selected and transferred from a "Set To B Width" circuit 138 to the "Selected Width" RAM 140 by operation of the "Select B Width" switch SB.

The selected width data in RAM 140 is transferred by line 142 to an "update Display" circuit 144 for further processing in the manner to be described. Of course it must be understood that line indications such as line 142 just described and other lines in the diagram of FIG. 5 are merely for explanatory purposes and many of them represent the transfer of binary numbers representing position of cells in one of the cell arrays CU or CL.

Deck Select

As to the selection of a deck for display, successive operation of the "Deck Select" switch S-U/L flips an internal toggle 146 in the CPU which stores the selected deck instruction in a RAM 148. The selected deck instruction is also transferred by a line 150 to the "Update Display" circuit 144, previously described. Also, as indicated by a line 150*a*, the selected deck data enters a Cursor Position circuit 152 which can be characterized as a "which display?" circuit. The circuit 152 is a logic circuit which determines whether to display article configuration or cursor position only. It can be considered as having two elements, namely, a "New Cursor Position" element 152*a* and a "Cursor Stationary" element 152*b*. The selected deck information also enters the cursor position logic element 152 in order to select the cell display array CU or CL and associated registers.

Cursor System

The operation of the cursor system is interrelated with the operation of three deck storage registers or RAMS which have not been described in detail. However, before describing the aforesaid inter-relation, the entry of cursor position and its processing within the CPU will be mentioned.

The previously described operation of the cursor potentiometer control CP causes an A/D converter to deliver a binary number from 0–255, representing selected cursor position, to the CPU. The cursor position number enters the CPU by the cable K and is processed by a "Read Cursor Position" circuit 153. This circuit divides the cursor position number by 2 and discards several upper and lower numbers, leaving a remainder of 120 numbers (0–119), as will be described presently. The aforesaid division of the input number by 2 increases the accuracy of the cursor control potentiometer CP'. The resultant binary new cursor position number which may be from 0–119, is received by a "New Position" RAM 154 in the CPU. The new cursor position is sent to the "which display?" logic circuit 152, as indicated by a line 155.

As the operator moves the cursor position control CP to shift the cursor cell along an array, the CPU senses this change in cursor position by comparing the new cursor position in RAM 154 with the immediately preceeding or last cursor position. This is made possible by also including a "Last Position" RAM 156 in the CPU and by comparing the data in the two RAMS to see if there is a difference. After the comparison has been made, and if there is a difference, the new cursor position data in RAM 154 is transferred to the "Last Position" RAM 156, as indicated by a line 157. Thus the data in RAM 155 becomes the "last position" for subsequent comparisons.

Last cursor position in RAM 156 enters the logic circuit 152 as indicated by a line 158 and also enters the "Update Display" circuit 144 as indicated by a line 158*a*. As will be seen in connection with the flow chart of FIG. 7, the logic circuit 152 shown in FIG. 5 basically determines whether or not to display the new cursor position only (when the cursor is moving) or to display both article configuration and the last cursor position (when the cursor is stationary).

Deck Registers

A "deck register" as that term is herein employed, is an assigned section of internally available computer random access memories or RAM's. Each register has 120 assigned addresses or positions corresponding to cell position numbers 0–119 in the base 10 numbering system. Each RAM position can be accessed by an indexed address signal, which index numerically corresponds to one of the aforesaid cell position numbers. Once addressed, each cell is then set to the desired value (logic low or (0) for "on" and logic high or (1) for "off").

In the present invention the CPU incorporates three deck registers, any one of which can store the output data for any combination of address or position numbers corresponding to cells 0–119 in an array. Each of these registers function as a RAM and the set of registers includes an "Upper Deck" register 160, a "Lower Deck" register 162 and a "Virtual Deck" register 164. The upper and lower deck RAMS 160, 162 receive and store board width and position data as well as the last cursor position for display by the cell arrays CU and CL. The "Virtual Deck" ram 164 can perform two functions. It can receive board configuration data from either the upper deck or the lower deck RAMS and transfer it to the shift register for the selected deck display or it can receive cursor position only and transfer it to the selected deck display. With this three register system, when cursor position only is being displayed any previously entered deck board data is not lost during "cursor only" display, because it remains stored in the selected upper and lower deck registers 160, 162.

The "Update Display" circuit 144 writes deck board data, as measured from the last stationary cursor position in the upper deck RAM 160 as indicated by a line 166. Deck board data is written into the lower deck RAM 162 by a line 168.

In the system of the present invention (FIG. 5), the shift registers which energize the display cells C in a selected row CU or CL do not receive data bits directly from the Upper and Lower deck RAMS 160, 162 but are filled by data from the Virtual Deck RAM 164. Thus, configuration data in the Upper Deck RAM 160 can be read by the logic circuit 152, as indicated by a line 170, and corresponding configuration data from the Lower Deck RAM 162 can be read by the logic circuit 152 as indicated by a line 172 in FIG. 5.

As mentioned, the "Virtual Deck" RAM 164 can receive and transfer display data stored in either the Upper or Lower Deck RAMS 160, 162 or it can transfer data as to cursor position only. Thus, the Virtual Deck 164 receives selected deck data from the logic circuit 152, as indicated by a "Write" line 174, and transfers that data as display signals back to the logic circuit 152 as indicated by a "Display" line 176. Depending upon which deck has been selected for display, the logic circuit 152 transfers data from the Virtual Deck RAM 164 either to an upper data output line 178 or to a lower data output line 180. The upper data line 178 is the input to the display line UD for the upper row of shift registers SR-1U, etc. The lower data line 180 is the input to the lower display line LD for the lower shift registers SR-1L, etc.

SELECTIVE CLEAR

At times, while the operator is positioning the cursor in selecting board width data for display in the manner previously described, the operator may leave the cursor in its last position and enter a selected board width under circumstances wherein the last cursor position represents a position error, or the operator may enter an incorrectly selected board width. The selective clear circuits of the present invention enable the operator to correct these errors and proceed with his entry of article configuration and position data into the CPU without having to return to position 0 at a given deck being displayed and start with the entry of data for that deck anew.

On depressing the "Selective Clear" button SC, a "clear" signal is transmitted by a line 192 to a selective clear circuit symbolized by a block 194. The selective clear circuit 194 also receives data as to the selected deck by a branch line **150*b* of the selected deck line 150 and receives data as to the last cursor position by a branch line 158*b* of the last cursor position line 158**. When the selective clear operation is performed, the cursor position will normally be unchanged so that the last position of the cursor will represent its current or "new" position.

Depending upon which deck has been selected (line 150), the selective clear operation transmits cell clearing signals to either the Upper Deck RAM 160 via a line 166 or to the Lower Deck RAM 162 via a line 198.

When the "Selective Clear" button SC is depressed the selective clear system causes the CPU to go through a self interrogating process whereby it finds the first unlit cell (first cell having a condition 1) to the left of the last cursor position and then proceeds to clear (write condition 1's) in all cells to the right of the first unlit cell. This operation changes all O's to the right of the first unlit cell to a condition 1, thereby selectively clearing the upper or lower deck registers 160, 162 along with the display CU or CL, depending upon the deck selection. When the data in the upper and lower deck registers 160, 162 are thus cleared, this information is read by the logic system 152 and is thereupon transferred to the virtual or transfer deck 164 for introduction of the clearing action into the display system in the manner previously described.

Machine Control

As previously described, the deck board configuration data is written into the "Upper Deck" and the "Lower Deck" RAM's 160, 162 for display via the "Update Display" system illustrated by block 144 in the diagram of FIG. 5. Article configuration data for both decks of the pallet is also transmitted from the Update Display system, as indicated by a line 200, to a "Machine Control" system illustrated by a block 202. The circuits in the machine control system convert the stored and displayed data into machine positions which are stored in a control table. The machine control data are delivered by an output line MD (which will actually consist of several outputs) to a machine control system which is designed to operate in response to such data. In the embodiment of the invention disclosed the machine is a pallet nailing machine such as that disclosed in the aforesaid Billett et al U.S. Pat. No. 4,392,600.

DISPLAY LOGIC

Figure 6:
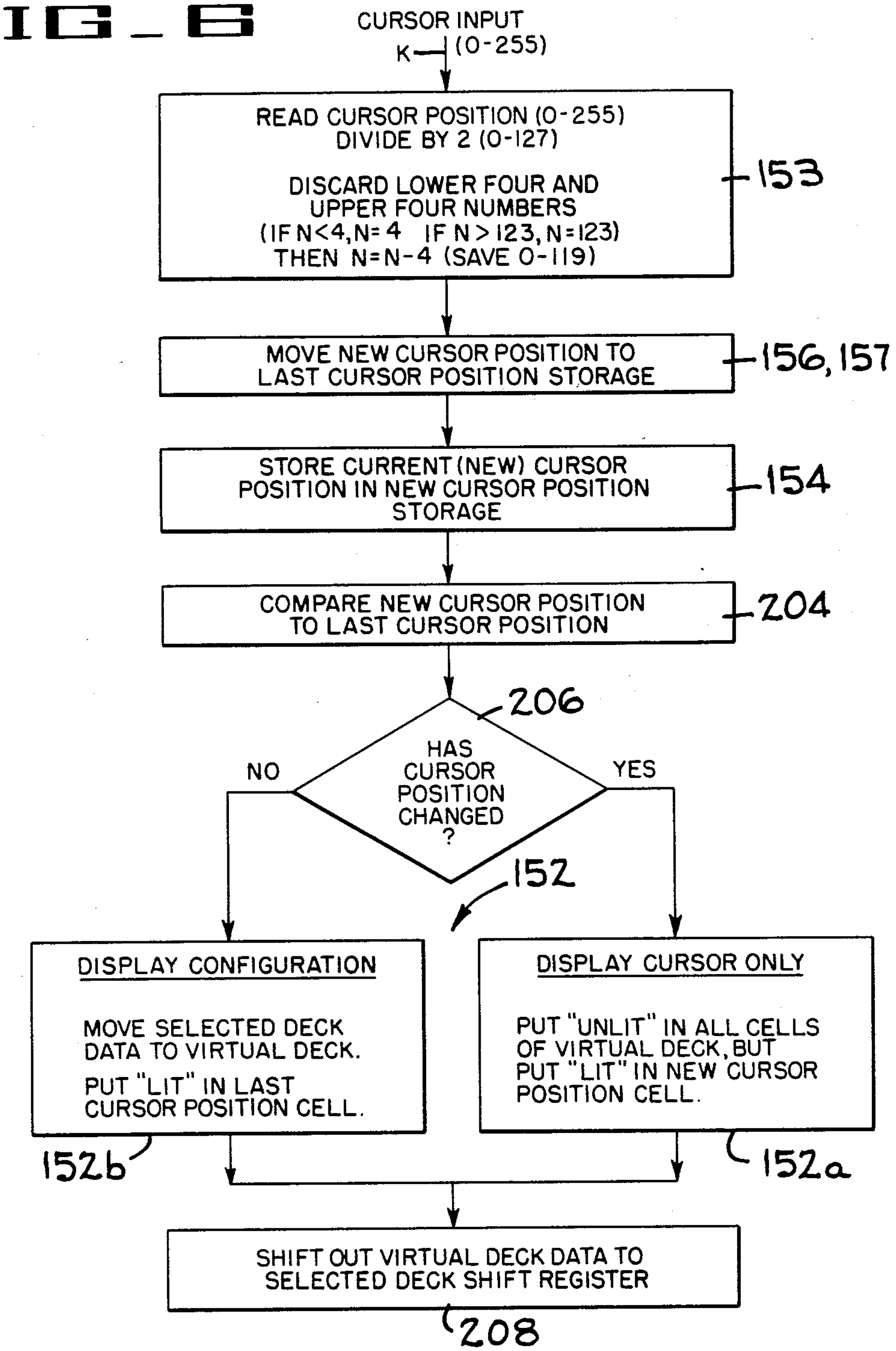
FIG. 6 is a flow diagram relating data display to cursor operations.

The diagram of FIG. 6 is a flow chart which comprises a series of connected blocks representing a sequence of operations carried out by the CPU, which are also illustrated in a different, symbolic manner in the diagram of FIG. 5, just described. Some of the operational components referred to in FIG. 5 have counterparts in the flow chart of FIG. 6 and are so numbered. In reality, the flow chart of FIG. 6 is a symbolic representation of the microcomputer program and is a conventional method of representing same. The computer operations illustrated in FIG. 5 are primarily brief descriptions and except for the registers or memories, the boxes in which these descriptions appear do not specifically represent computer components.

As seen in FIG. 6, the cursor input data is introduced from line K and represents cursor position in terms of any of 256 binary numbers, from 0–255. The microcomputer reads the cursor position which can have any position number from 0–255 and divides that position number by 2, which provides binary numbers 0–127 representing any cursor position from 0–127. The purpose of supplying the computer with twice the position numbers to be utilized is to increase the smoothness and accuracy of the output from the control potentiometer CP′. Furthermore, 8 bit resolution is standard for A/D converters.

In order to avoid utilization of the extreme upper and lower ends of the control potentiometer CP′, at which zones the precision of the potentiometer might be suspect, the CPU discards the lower four and the upper four numbers, as indicated in block 153 in FIG. 6. The computer accomplishes this by a conventional internal interrogation process. Thus, if N, the number representing cursor input after division by 2 is less than 4, N is set equal to 4. Also, if N is greater than 123 then N is set equal to 123. The computer subtracts 4 from N and saves 120 numbers representing cursor position information, namely, numbers 0–119.

Figure 6A:
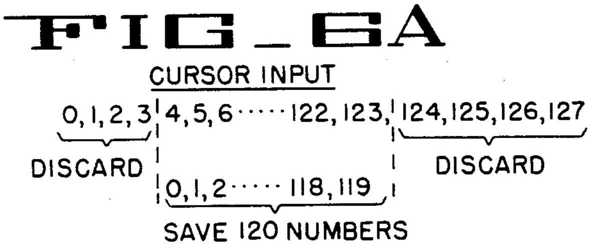
FIG. 6A is a detail illustrating the discard of unused cursor input numbers.

FIG. 6A is a diagram illustrating the cursor position number discard process carried out as indicated in the block 156 in the flow chart of FIG. 6. FIG. 6A illustrates the 128 numbers numbered from 0–127 (after division by 2) and it also shows how the lower 4 numbers, namely, 0–3 are discarded as well as the upper 4 numbers, namely, 124–127. Thus, as previously mentioned, the computer saves 120 numbers, namely, 0–119.

Whenever the cursor is moved from a last cursor position to a new cursor position sufficiently to change the 0–255 A/D output by two numbers, the resultant change after division by two is sensed as a cursor position number change by the computer. The computer moves the previous new cursor position to the last cursor position storage RAM as previously indicated by line 157 in the diagram of FIG. 5. The computer also stores the current new cursor position in the new cursor position storage RAM, which storage was previously indicated by the block 154 in the diagram of FIG. 5.

The means by which the computer ascertains whether or not the cursor has moved is to compare the new cursor position to the last cursor position, the instruction to perform the comparison operation is illustrated diagrammatically by block 204 in the flow chart of FIG. 6.

The diamond-shaped block 206 of the flow chart of FIG. 6 represents performance of the comparison and a logic or decision process carried out by the computer as a result of the comparison. The computer (in effect) asks itself "Has cursor position changed?". If the cursor position has not changed, i.e., if the cursor is stationary and the answer is "no" then the processing is directed to the "Display Configuration" routine, previously indicated at 152*b* block in FIG. 5. As previously described, this routine is accomplished by moving the configuration data in the selected deck register to the virtual or transfer deck register as explained in connection with FIG. 5, the selected deck register can either be the "Upper Deck" register 160 or the "Lower Deck" register 162.

Also, if the cursor position has not changed and as indicated by flow chart block 152*b*, the computer is directed to put "lit" (0) in the last cursor position cell. This cell will correspond to an address in the selected deck register 160 or 162 and the data will also be written in the virtual direct register 164. Cursor position can be any of the cells numbered from 0–119.

The next step carried out by the computer (FIG. 6), in the conditions assumed when the cursor position has not changed, is indicated in flow chart block 208. The directions are to shift out the virtual deck data to the selected deck shift register. This data, as previously described in connection with FIG. 5, will either be outputed by display line UD for the upper shift registers SR-1U etc., or by output line LD to shift registers SR-1L, etc. As also previously described, in the 120 bits of information shifted out to the shift registers for display, those bits which will light display cells are 0's and those bits in the array which will hold the cells dark are 1's. Thus, the shift register receives a string of 120 bits in inverse order, namely, the higher numbered bit is entered first and when 120 bits have entered each row of shift registers the transfer of display information to the shift registers is completed. The shift registers will thus be loaded with strings of 1's and 0's corresponding to the display cells which are to be either illuminated or darkened.

Referring again to FIG. 6, if the operator is moving the cursor by operating the cursor potentiometer knob CP then there will be a new cursor position which differs from the last cursor position stored by the computer and the computer will sense that the cursor position has changed. In this case, the decision indicated by the diamond-shaped block 206 in FIG. 6 is "yes" in which case the operations previously indicated in connection with block 152*a* of FIG. 5 are carried out. When the cursor position is being changed by the operator the system displays the cursor only and certain programmed instructions are carried out by the computer. As seen in block 152*a*, the computer is programmed to put "unlit" in all cells of the Virtual (transfer) Deck but to put "lit" in the new cursor position cell. This is for displaying the cursor only. As indicated in flow chart block 208, the new cursor position in the Virtual Deck register 164 is shifted out to the selected deck shift registers.

Thus the flow chart of FIG. 6 illustrates how the computer is programmed to display both article configuration data and last cursor position when the cursor is stationary and to display cursor position only when the cursor position is being changed.

SHIFT REGISTER CONNECTIONS

Figures 7, 7A:
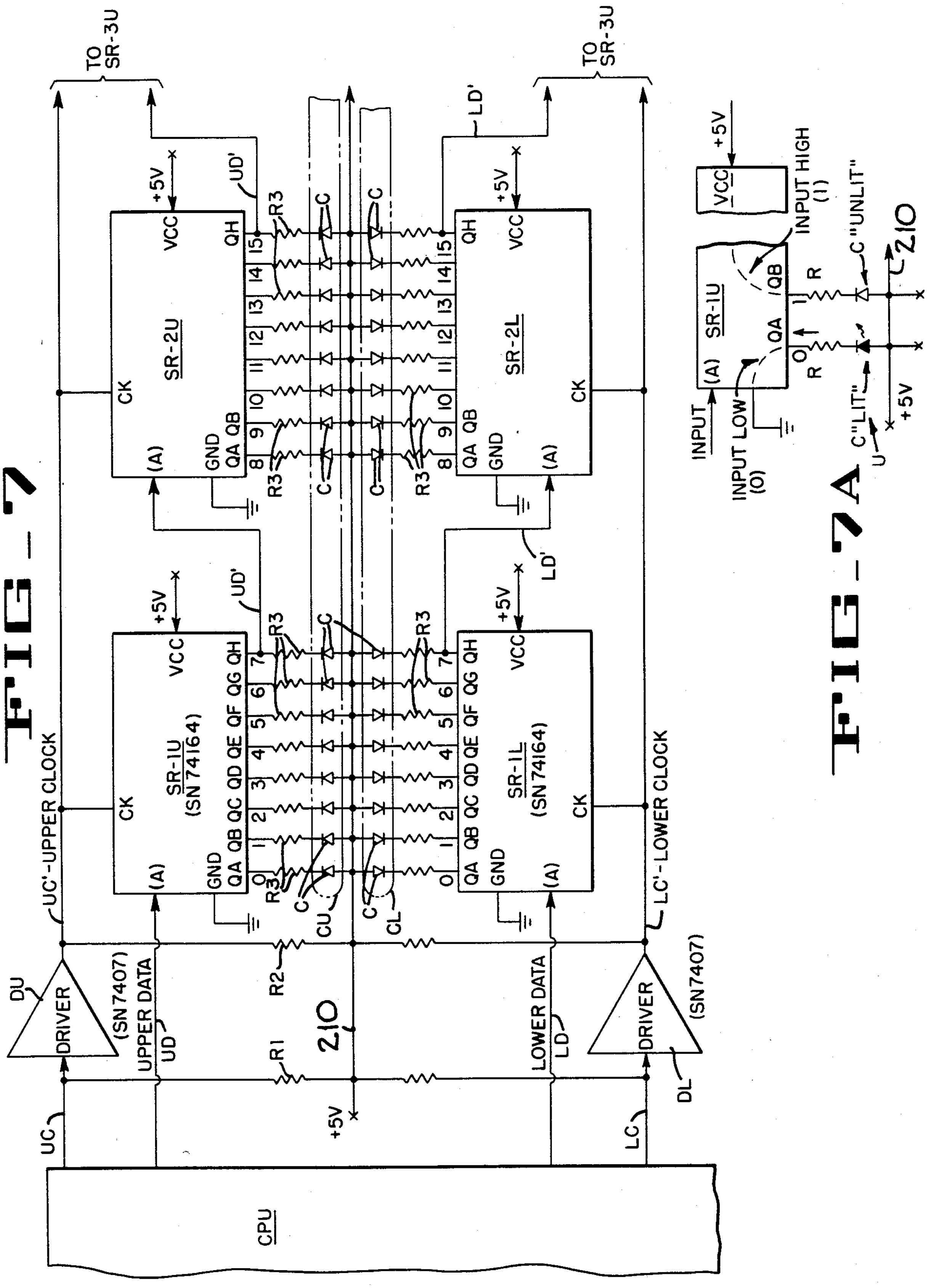
FIG. 7 is a fragmentary schematic diagram of the shift registers and arrays of display cells.
FIG. 7A is a diagram showing how a display cell is lit.

FIG. 7 is a partial diagram of the shift register and display cell circuits, wherein each cell C is a light emitting diode (LED). Referring to the upper display CU, only the first two shift register units of the 15 employed are shown, namely, SR-1U and SR-2U. Each shift register unit provides for the parallel output of 8 bits of input data, namely, bits 0–7 for SR-1U, bits 8–15 for SR-2L, etc. The storage of input data continues up to bits 112–119 for the last shift register unit SR-15U, not shown in FIG. 7 but indicated in FIG. 3.

The string of 120 bits (1's) or (0's) representing article configuration and cursor position data for the upper display CU enter input terminal (A) of SR-1U. This data is received from the CPU via upper data line UD. The data bits are stepped through SR-1U by clock pulses UCP in output line UC of the CPU (see FIG. 3), which pulses enter a driver DU and are simultaneously passed on to terminals CK of each shift register unit via an upper clock line UC′. The line UC′ has a branch for each shift register unit.

The potential of both ends of the driver DU is raised to +5 volts by connections to a +5 volt line 210 through resistors R1 and R2. Each shift register unit SR-1U, etc. receives a +5 V input to its terminal VCC from a common supply and has a ground connection GND.

The 8 bit parallel output terminals QA–QH of each shift register unit each represent a number in the 0–119 binary signal data presented to the series of 15 shift register units. The output terminals QA–QH of SR-1U represent the 8 display cell numbers 0–7, terminals QA–QH of SR-2U represent the 8 display cell numbers 8–15 and so on down the line up to the last cell number 119 in SR-15U (not shown).

As mentioned, the CPU data from the upper data line UC is presented serially and in inverse order. Thus, the bit for the last display cell, cell number 119 (either 0 or 1) enters first, and the bit for the first cell, cell number 0, enters last. Thus, when data entry starts, the bit for cell number 119 will be stepped along from QA to QH by the upper clock pulses in the clock line UC'. Of course, bits 118, 117, etc. follow in reverse sequence. When shift register SR-1U has received 8 bits, the first bit entered will be at terminal QH and on the next clock pulse, this bit will be shifted from QH by via a line UD' to the input terminal (A) of the next shift register unit, SR-2U. The aforesaid sequential bit stepping process proceeds until the highest bit number 119 (the first to enter SR-1U), is at the last terminal QH of the shift register unit SR-15U, which is the last of the 15 shift register units for the upper display CU. At this time, data entry has been completed and the 120 data bits, either 0's or 1's, representing cells No. 0–119 will be stored in the complete series of shift register units.

Cell Illumination

Referring to FIG. 7, each output terminal QA–QH of each shift registry unit is connected through a resistor R3 to the cathode of an LED which forms one of the electrically energizable display cells C of the upper display row CU of cells. The anodes of all 120 LED's have a common connection to the +5 volt power supply line 210.

The shift register connections for the cells C of the lower display CL are the same as those for the upper display CU. These connections are shown in FIG. 7 and no detailed description thereof is believed necessary.

In the system being described, the presence of a high (1) input at any output terminal QA–QH of a shift register unit represents an "unlit" condition for the associated LED cell C. The presence of a low (0) input at any output terminal of a shift register unit causes the associated LED cell C to become "lit". This action is explained in the fragmentary diagram of FIG. 7A. This figure shows the cells C for cell position numbers 0 and 1 connected to the shift register output terminals QA and QB of unit SR-1U. Referring to the cell C at position No. 0, when the input to terminal (A) is low (0), terminal QA of SR-1U is connected to the ground terminal GND internally of the shift register by an internal switch in a known manner. This applies a forward bias to the LED for the cell C at position 0 and causes it to assume its "lit" condition because the +5 V supply from line 210 passes through resistor R and the LED to ground.

When the input signal to a shift register output terminal, such as a terminal QB in FIG. 7A, is high (1) the internal switch of the shift register connects the output terminal QB to the +5 volt supply at terminal VCC of the shift register. Thus, there is no voltage differential between the +5 volt supply in line 210 for the anode of the LED and the supply for its cathode at terminal VCC and no current flows through the LED. Under these conditions cell C being described at position number 1 remains "unlit".

By way of example, each 8 bit shift register can be Part No. SN 74164 manufactured by the Texas Instruments Corporation and the driver's DU, DL can each be Part No. SN 7407 manufactured by the Texas Instruments Corporation. The array of display cells C forming the upper and lower arrays of display cell C can each be assembled by the end stacking of ten "Bar Graph" units MV57164 manufactured by the General Instruments Company of Palo Alto, Calif. The illumination of the individual LED's in these units is viewed through a rectangular translucent window. The CPU can be a 8085 unit manufactured by the Intel Corporation of Santa Clara, Calif.

DISPLAY CELL ARRANGEMENT

Figure 8:
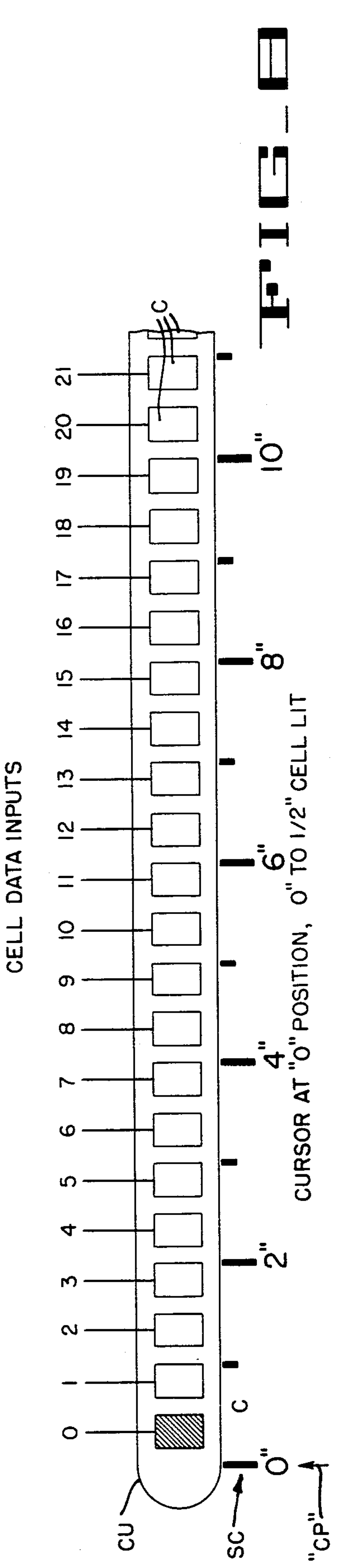
FIGS. 8-10 are fragmentary diagrams of the upper array of display cells showing what the cells represent on an inches scale.
Figure 9:
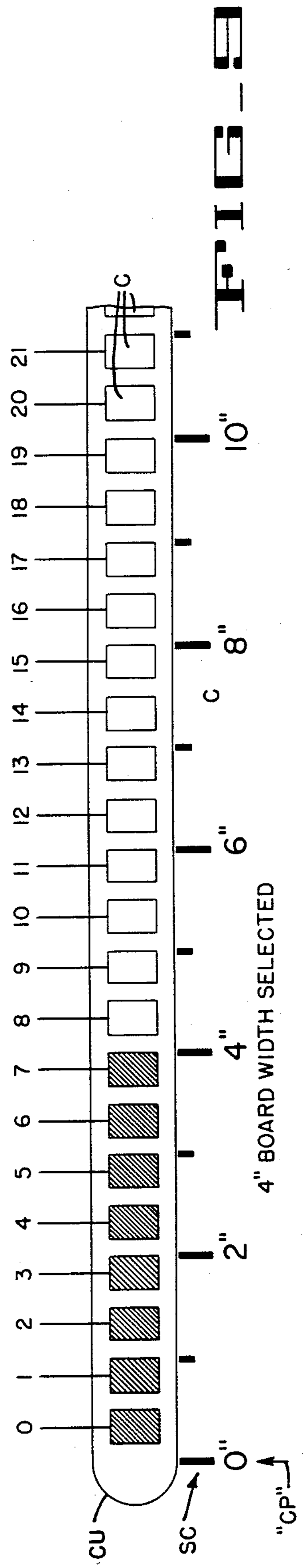
Figure 10:
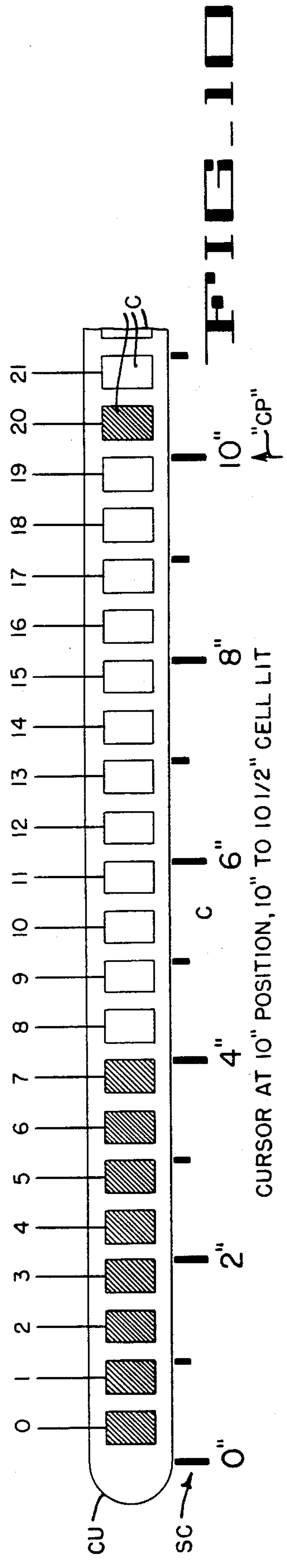

FIGS. 8–10 are partial views of the upper display CU showing the physical arrangement of the cells C relative to the associated inches scale SC appearing on the display panel P of FIG. 1.

In these diagrams, a fictitious position arrow "CP" has been added to represent the cursor positions selected by the operator through his manipulation of the cursor position control CP of potentiometer CP', previously described. However, the arrow "CP" is merely added for purposes of explanation because the selected cursor position is actually indicated to the operator by the illumination of a display cell C in the selected deck array.

The inches scale SC is provided to indicate both deck board position and width along the pallet stringers. In the embodiment shown, the scale accommodates a 60 inch pallet (see FIG. 1) and is numbered at the even inch marks.

There are 120 display cells C numbered 0–119. The first cell C, having the data input number 0, is positioned to represent a deck board width of 0" to ½". The second cell, data input number cell 1, represents ½" to 1", etc. Thus cell No. 7, the 8th cell, represents 7½" to 8".

In the condition shown in FIG. 8, the operator has operated the cursor position control CP (FIG. 1) to set cursor position to 0 on the inches scale SC and has left it there. This is indicated in FIG. 8 by the fictitious arrow "CP". The circuit now illuminates the first cell C, having data input number 0.

In FIG. 9 with the cursor position control CP remaining at 0 on the inches scale, the operator has selected a 4" board width with switch SA. Under these conditions, the system will light cells numbered 0–7, illumination of these 8 cells indicating a 4" deck board on the inches scale at 0" to 4". The fact that cell number 0 was previously illuminated as a cursor position cell is immaterial because the CPU merely rewrites the low or 0 input condition into the associated deck register, which has no affect on the register contents and outputs.

In FIG. 10 the operator has moved the cursor position "CP" to the 10" position on the scale SC and has left it there, whereupon cell No. 20 representing 10" to 10½" is lit. Cells number 0–7 remain lit thereby continuing to indicate the previous selection of a 4" board at the scale position of "0–4"".

SUMMARY OF OPERATION

FIGS. 11–22 are fragmentary operational diagrams that illustrate various conditions during setting up a display. In each figure, data stored in the upper deck register 160 and in the virtual or transfer register 164 are superposed on the upper row CU of display cell C. There are 120 data address positions (numbered 0–119) in each register and 120 cells in the display CU, the display cell positions also being numbered 0–119 along the inches scale SC. As before, a data bit or condition "0" in a deck position indicates that a cell is "lit" and a data bit or condition "1" indicates that a cell is "unlit". A fictitious cursor position arrow "CP" is shown at the display cell array, as in FIGS. 8–10. The "Select A" switch SA for selecting 4" boards and the "Selective Clear" switch SC are also indicated in each figure.

Figure 11:
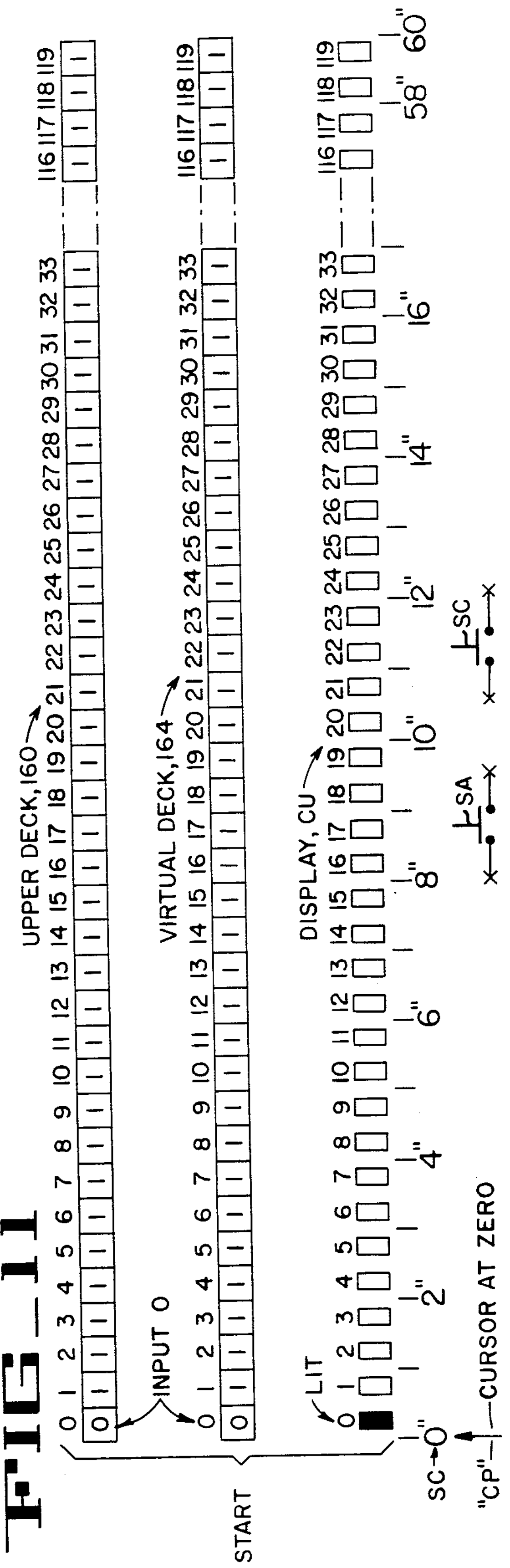
FIGS. 11-22 are schematic operational diagrams illustrating a sequence of operations.

FIG. 11 shows the display at the "Start" condition. The cursor "CP" has been set to 0" on scale SC. With the cursor at this position, the inputs from the CPU to address number 0 of the upper deck register 160 is a low or 0 and the inputs to the remaining address numbers 1–119 are all highs or 1's. With the cursor stationary, the data pattern in each upper deck register 160 is transferred to the virtual deck register 164, as previously explained. Also, the virtual deck has transferred the data to the shift registers for display cell illumination, as has also been explained. Thus, the first cell C, No. 0, is lit and all others are dark.

Figure 12:
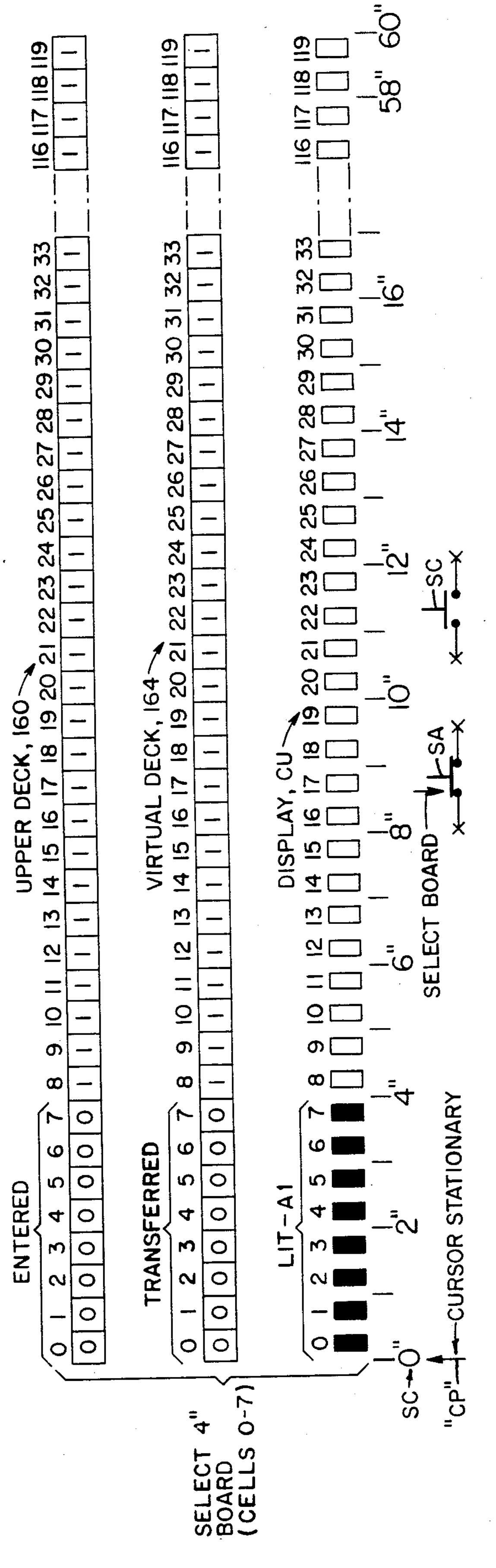

FIG. 12 shows "Select 4 Inch Board" conditions. The cursor position "CP" is stationary at 0 on the inches scale and the "Select A" switch SA has been closed. As a result, 0's have been entered in address numbers 0–7 of the upper deck register 160 and transferred to the virtual deck register 164. The group A1 of 8 cells numbered 0–7 of the display CU are lit. This group displays the 4 inch deck board A1' (FIG. 1A) at the "0–4" position on the inches scale SC.

Figures 13, 14:
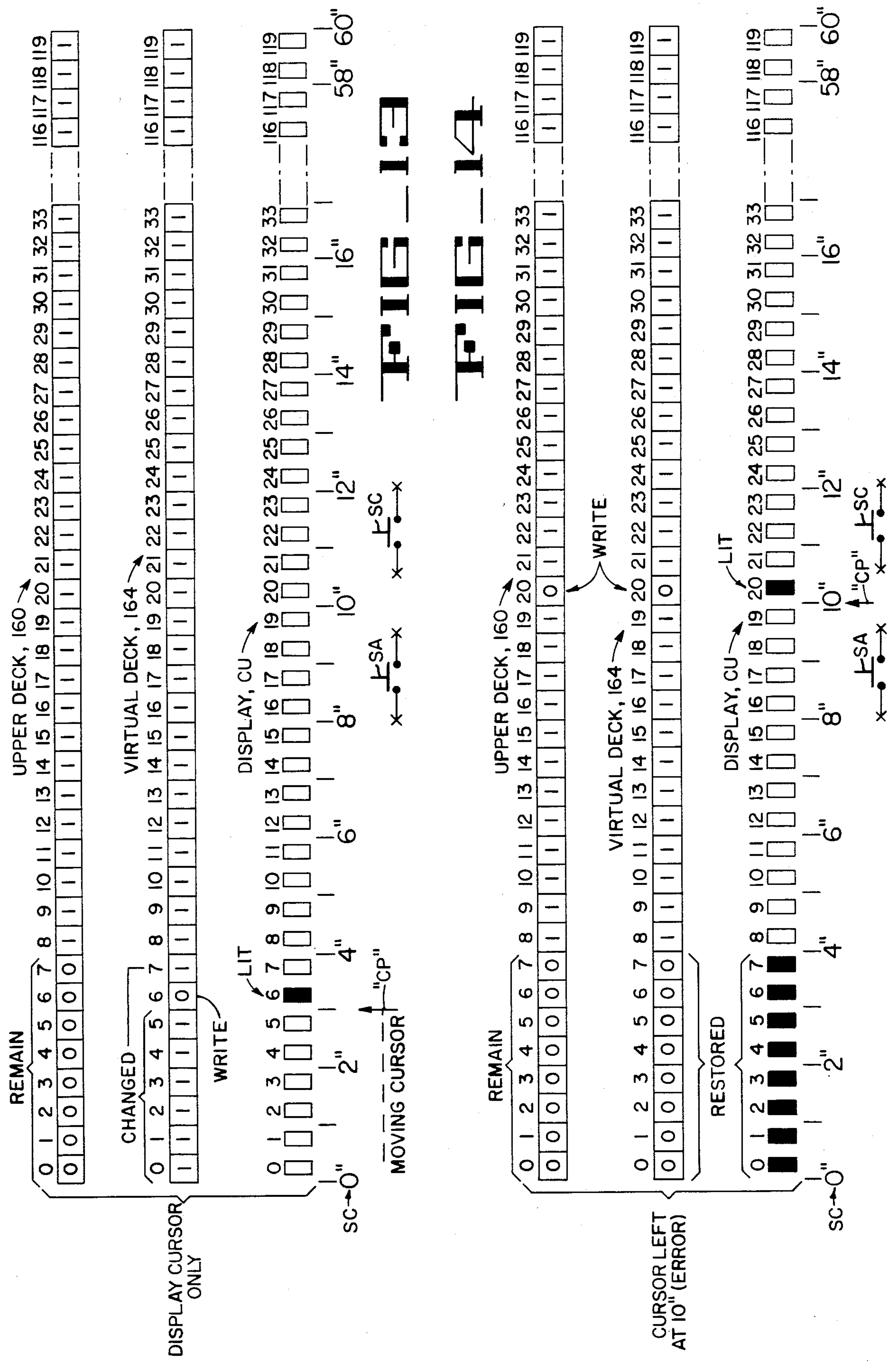

FIG. 13 illustrates "Display Cursor Only" conditions. The operator is moving the cursor control CP as indicated by the moving fictitious cursor arrow "CP" and the new cursor position is at cell number 6. Under these conditions, the previously entered data bit 0's remain at positions 0–7 of the upper deck register 160 but since the cursor is moving, the CPU logic changes its inputs to address numbers 0–5 and 7 of the virtual deck 164 from 0's to 1's. The only 0 data bit in the virtual deck register is at address No. 6 representing the new position of the moving cursor, and all of the other data bits in the virtual deck are 1's. As a result, in the display CU, only cell No. 6 is lit representing the new cursor position at 3½" along the inches scale SC.

In FIG. 14 the cursor has been left at the 10" scale position for entry of a board width. The CPU writes a 0 at position number 20 of the upper deck and the 0 is transferred to the same position of the virtual deck. Cell number 20 is now "lit". However, the 10" position will assume to be an unrecognized error. The 0's at address positions No. 0–7 in the upper deck register remain and since the cursor position "CP" is stationary at 10", the 0's are restored in address positions No. 0–7 of the virtual deck register 164. The illumination of the "0–4" board cells in the display CU, previously entered is also restored.

Figure 15:
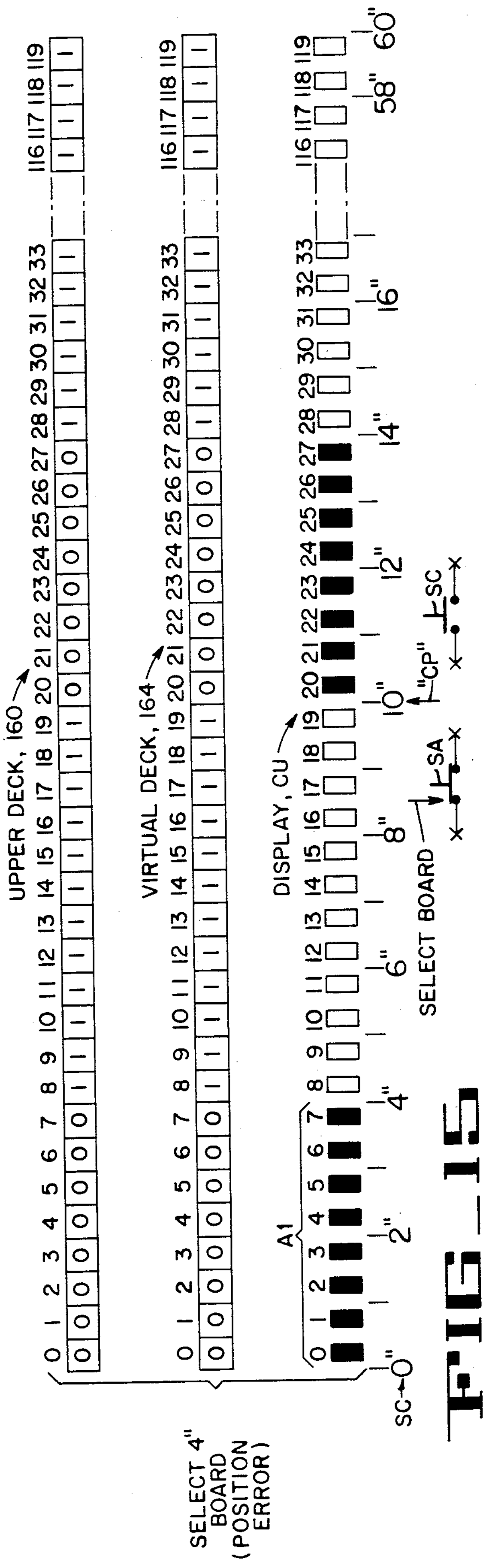

In FIG. 15, the operator has closed the "Select Board" switch SA to select another 4" board, lighting cell numbers 20–27 in the display CU, but this is a position error, as described in connection with FIG. 12. These cells represent a 4" board at the 10" to the 14" position on the scale SC.

Figure 16:
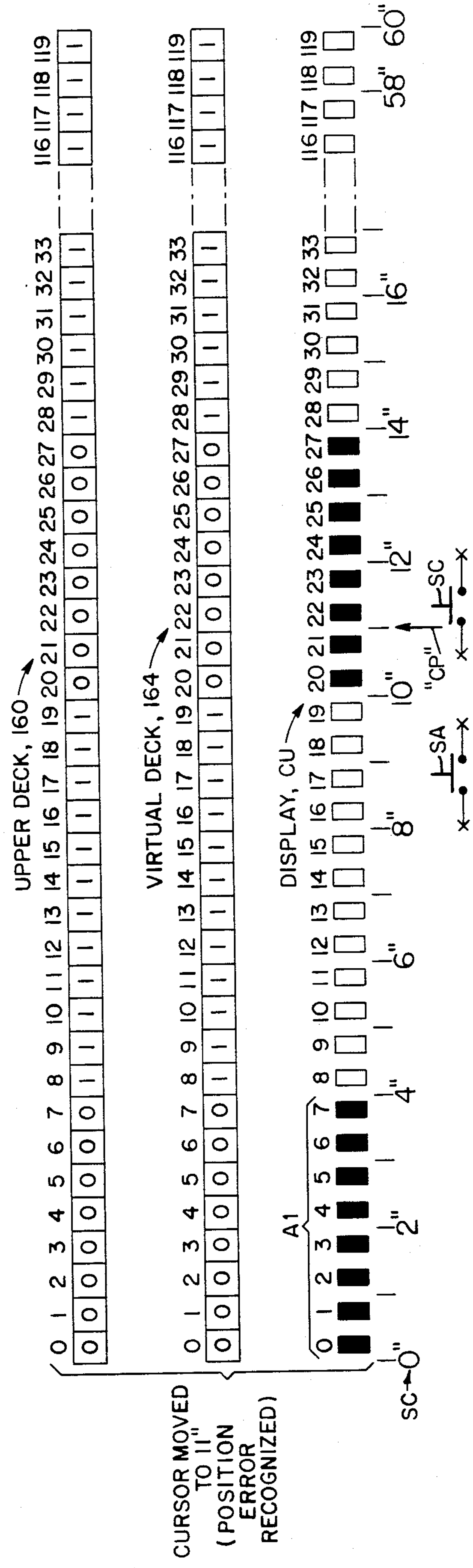

The conditions of FIG. 16 are like those of 15 except that the cursor "CP" has been moved to and left at cell No. 22, representing the 11" position on the inches scale SC. Although the cursor position is masked by the previous illumination of cells 20–27 in the display CU, the board position error will be assumed to have been recognized by the operator at this point.

Figure 17:
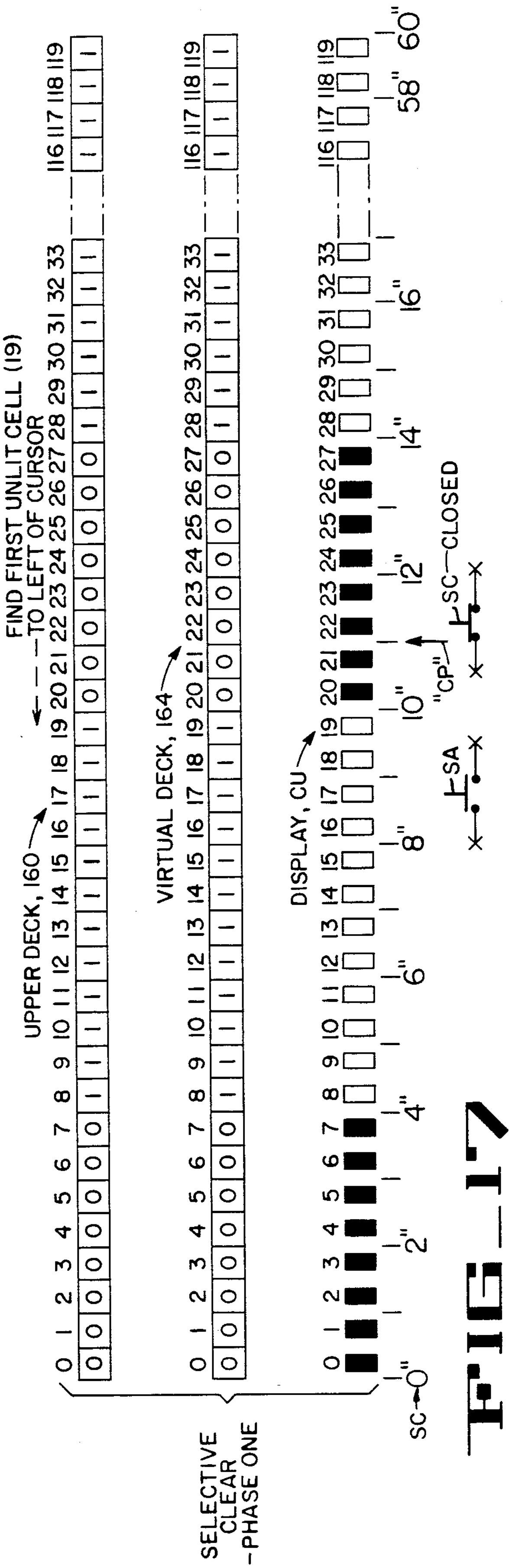

FIG. 17 illustrates a "Selective Clear" operation, phase one. The operator has closed the "Selective Clear" switch SC with the cursor position "CP" left at display cell No. 22. The CPU is programmed to find the first unlit cell (19) to the left of the cursor in the upper deck register 160, as phase 1 of the Selective Clear operation.

Figure 18:
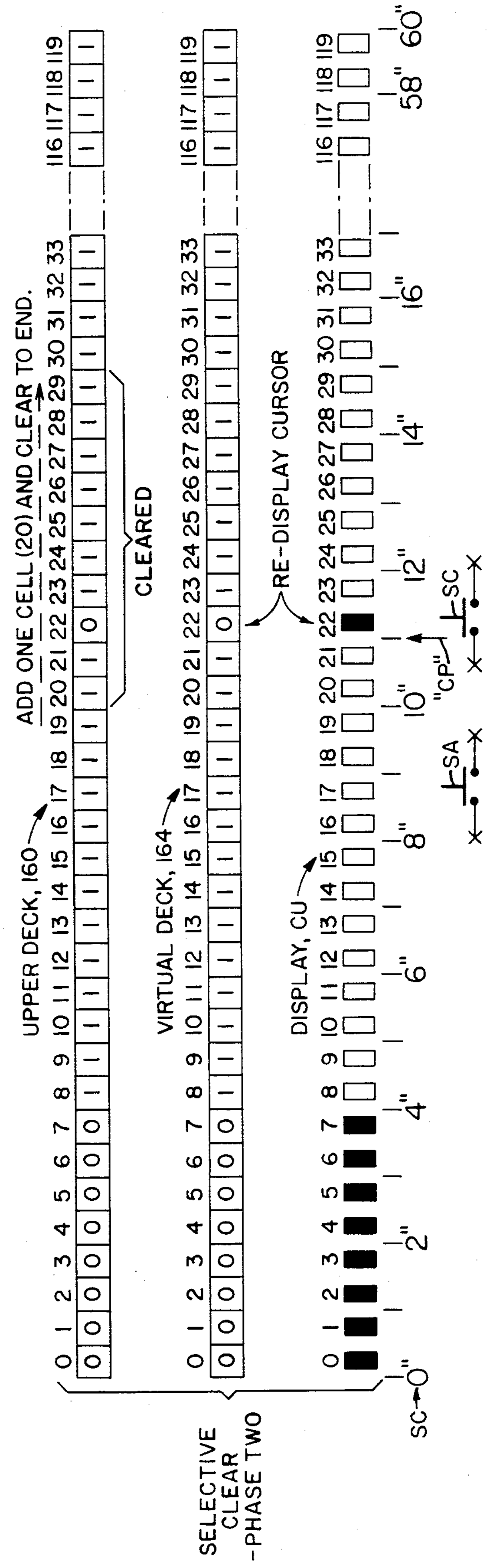

FIG. 18 illustrates the "Selective Clear" operation, phase 2. The CPU is programmed to add one cell to the first unlit cell position (e.g. 19) and to clear all the O's (write 1's) in the upper deck register 160 from the incremented cell position (e.g. 20) to the right end of the upper deck register. This will write 1's in register positions 20–119. The CPU is also programmed to redisplay the cursor by re-writing a data bit 0 at position No. 22 in the upper deck register 160. The data bit 0 at upper deck position 22 is transferred to position No. 22 of the virtual deck No. 164 which re-displays cursor position at cell No. 22 in the display CU. The operator is now prepared to re-enter the selected 4" board at a correct position.

Figures 19, 20:
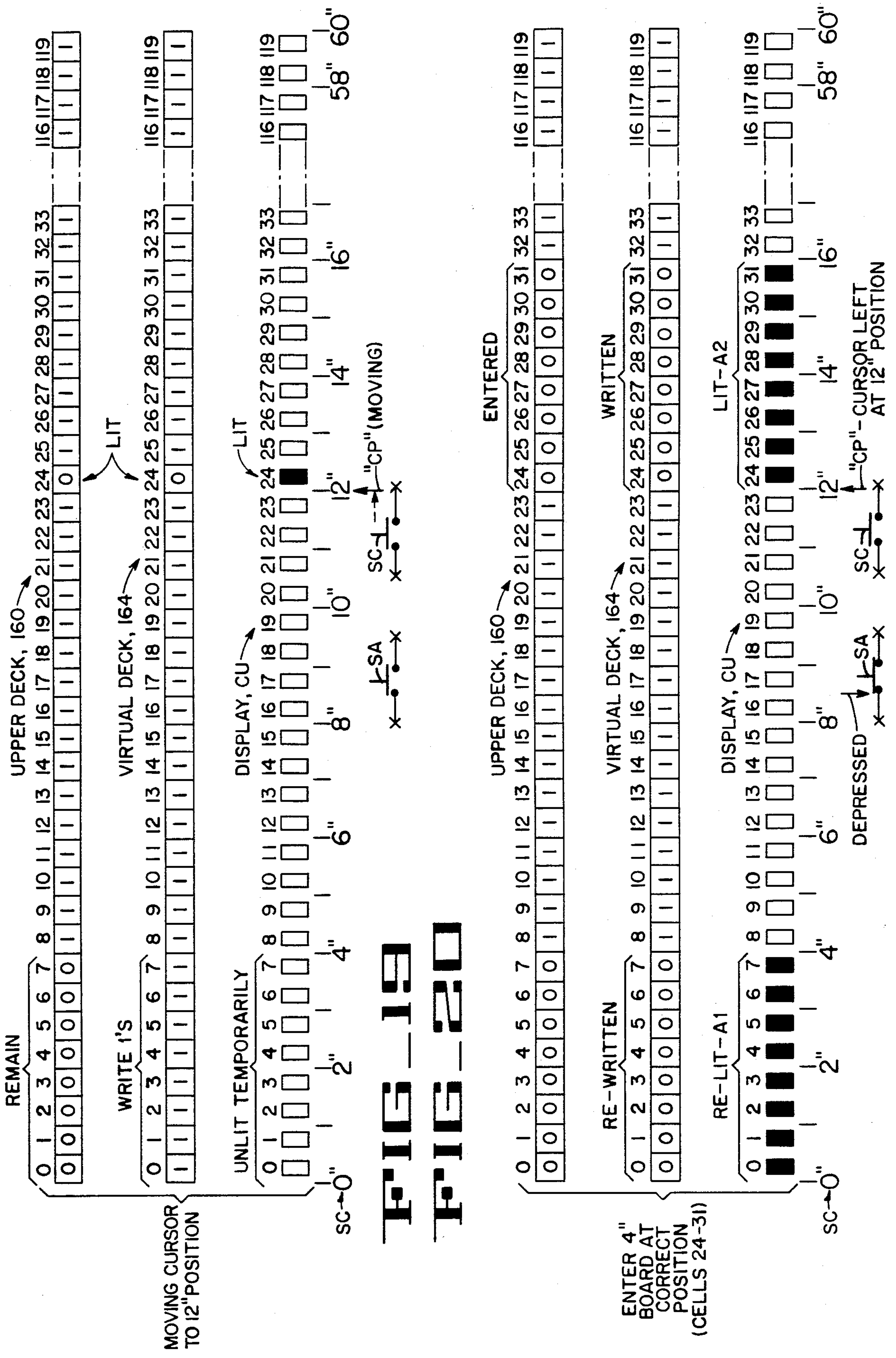

In FIG. 19, the operator is in the process of moving the cursor "CP" to the 12" position on the inches scale SC. Although the new cursor position is different from the last cursor position, the data bit 0's previously entered at position numbers 0–7 of the upper deck 160 remain. However, since the cursor is moving, the CPU logic circuits temporarily write data bit 1's at positions number 0–7 of the virtual deck register 164. Thus previously lit cells number 0–7 in the display, representing the first 4" board at 0–4 inches on the scale SC, are unlit temporarily. Only the new cursor position cell 24 is displayed at the 12" position, 12" to 12½" on the inches scale SC.

In FIG. 20, the cursor is left at the correct 12" position. The 0's remaining at positions 0–7 of the upper deck register 160 (see FIG. 19) are re-written in positions 0–7 of the vertical deck and cells 0–7 of the display are re-lit. Also, the operator enters a 4" board at that correct new position. The "Select A" switch SA is closed and data bit 0's are entered at position numbers 24–31 in the upper deck register. Corresponding data bit 0's are also transferred to position numbers 24–31 of the virtual deck, with which the group A2 of cells numbered 24–31 in the display CU are lit. The second 4" deck board A2' at the 12" to the 16" position along the inches scale is now displayed.

Figures 21, 22, 23:
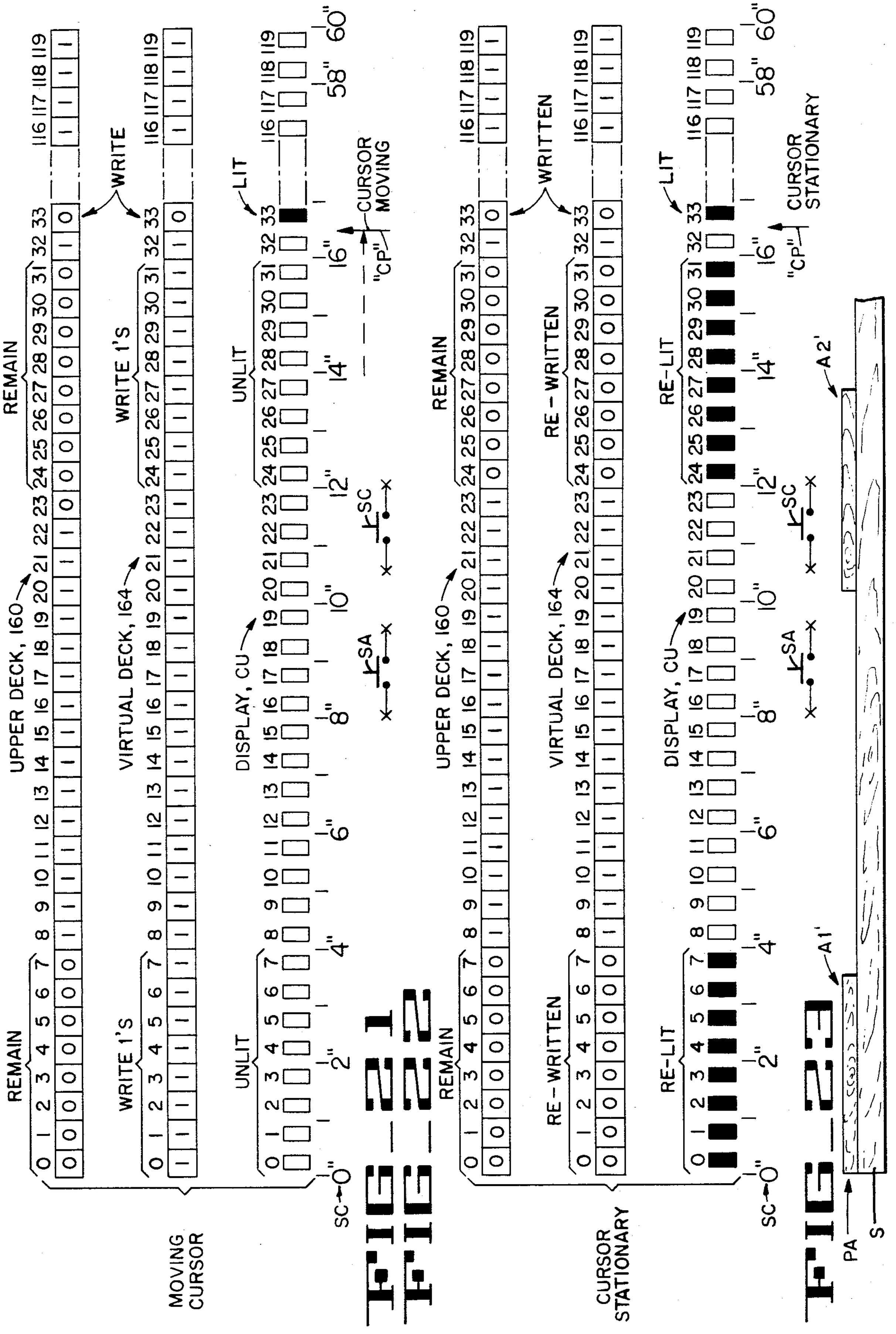
FIG. 23 shows a pallet continuation corresponding to that displayed in FIG. 22.

In FIG. 21, the operator is moving the cursor "CP" to a new cursor position at display cell No. 33. Although the cursor is moving, the data bit 0's remain at positions number 0–7 and 24–31 of the upper deck register 160. However, with the new cursor position differing from its last position, the CPU logic circuit writes 1's at position numbers 1–7 and numbers 24–31 of the virtual deck register 164, so that corresponding cells 0–7 and 24–31 in the display CU are unlit. The computer writes a data bit 0 at position number 33 in the upper and virtual deck registers so that cell number 33 in the display is lit. Again, with the cursor moving, only cursor position is displayed.

In FIG. 22, the cursor is stationary at display cell No. 33. Since the data bit 0's remained at position numbers 0–7 and 24–31 of the upper deck register 160, these 0's are re-written in the corresponding positions in the virtual deck. Thus cells No. 0–7 and 24–31 are re-lit, re-displaying 4" deck boards at the "0–4"" and at the 12"–16" scale positions on the display CU. These boards represent the deck boards A1' and A2' of the pallet PA, shown in FIGS. 23 and 1A.

Of course, the operator continues along the lines described in connection with FIGS. 11–22 to enter and display the selected deck board positions and widths along both the upper and the lower decks, representing a complete pallet PA, such as that shown in FIG. 1A. Also, as previously explained in connection with FIG. 5, the displayed data is stored in the CPU for control of an automatic machine, such as a pallet nailing machine described in the embodiment of the invention disclosed herein.

As mentioned, the system of the present invention includes a microcomputer or CPU along with peripheral hardware for control, data input and data display. The CPU includes the usual signal storage and retrieval functions such as the equivalents of random access memories (RAM's), programmable logic and decision making functions (some of which access the RAM's), a clock, a power supply, a deck select port, board size data input ports, a cursor input port, a selective clear input port and data output ports. The functions and operations of these elements of the CPU or microcomputer are controlled by a program which sequentially sets out a series of program steps in detail. These steps in the program could be provided by the appendage of a complete printout of the program (software). However, in order to present the mode of operation of the system in a more readily understandable form, the programmed operations of the CPU or microcomputer are presented as block diagrams with functionally descriptive legends and interconnecting data lines; flow charts and diagrams. This presentation, coupled with the illustration of peripheral hardware and its connections to the CPU, will enable a computer programmer skilled in the art to write a complete program for the CPU and associated hardware which program will provide the intended mode of operation of the system of the present invention.

Although a partial flow chart of subroutine performed by the CPU is presented, a complete flow chart of all the operations performed is not necessary for a full and complete disclosure of the invention to those skilled in the art.

Although the best mode contemplated for carrying out the present invention has been herein shown and described, it will be apparent that modification and variation may be made without departing from what is regarded to be the subject matter of the invention.

What is claimed is:

1. An article configuration display system comprising a row of electric display cells with each cell representing a fractional length of the length of the row, means for selectively lighting spaced groups of cells in the row as representations of article positions and article widths at said positions along the row, said selective cell lighting means comprising a configuration data storage register, means for selectively entering cell group length data into said configuration data register in binary form, a data transfer register for receiving binary configuration data from said data storage register, means for outputting the data from said data transfer register for lighting corresponding cells, selectively movable cursor means for entering article position data into said transfer register and blanking means for temporarily removing said article width data from said transfer register when the cursor position data entering said transfer register is changing.

2. The system of claim 1; comprising serial input, parallel output shift register means having input means for receiving the output data from said transfer register and outputs for lighting said cells.

3. A system for displaying the position and width of upper and lower deck boards on pallet stringers; said system comprising first display circuit means including a row of display cells for representing deck board position and width data for the upper deck of the pallet and second display circuit means including a row of cells for representing such data for the lower deck, a central processing unit, cursor means for sequentially and selectively entering deck board position data into said unit, means for selectively entering deck board width data into said unit at the deck board position data, register means in said central processing unit for receiving said data and means for transmitting said data from said register means to said display cell circuit means for lighting corresponding cells in the associated row of cells.

4. The system of claim 3; wherein said register means in the central processing unit comprises first and second deck board data storage register means for respectively storing data for said first and second display circuits and virtual data storage register means for selectively receiving data from either said first or said second data storage register means and transferring the data to selected display cell circuit means.

5. The system of claim 4; wherein said central processing unit comprises means for selectively transferring deck board position and width data to said first and second deck board data storage register means and means for transferring cursor position data directly to said virtual data storage register means when the cursor position is changing.

6. The system of claim 4; wherein said first and second display circuit means each comprises shift register means for receiving data from said virtual data storage register means and transferring said data to corresponding display cells in a selected row of cells.

7. The system of claim 6; wherein said shift register means each comprises serial input, parallel output shift registers, means for selectively connecting a shift register input to said virtual data storage register means and means for connecting the parallel outputs of the selected shift register to cells in the associated row of cells.

8. The system of claim 3; wherein said central processing unit comprises logic means for de-energizing previously lit display cells in a row when said cursor means position data are changing to represent a new cursor position in said row and means for re-energizing the previously lit cells in the row when said cursor means position data for the last cursor position are not changing.

9. The system of claim 3; wherein said register means comprises an article configuration data storage register for each row of cells and a data transfer register for receiving data from either of said storage registers and transmitting it to the associated display cell circuit means, said central processing unit having logic circuit means for transferring data from a selected configuration data storage register to said transfer register when the position data from said cursor means are not changing, said logic circuit means transmitting only position data from said cursor means to said transfer register when said cursor means position data are changing.

10. A programmable control system for supplying data to a machine for the construction of an article of manufacture, said system including display means comprising an array of electrically energizeable display cells for visually displaying the data as a configuration of the article to be constructed, a cursor circuit for energizing a selected cell in the array as a position display cursor cell, means for pre-selecting article configuration data means for converting said data into digital article configuration signals, memory means for storing said signals, means for energizing cells in the array in the vicinity of said cursor cell in response to said stored signals for displaying the pre-selected article configuration data at selected cursor positions and means for supplying said stored article configuration signals to an article construction machine.

11. The system of claim 10; wherein said cursor circuit comprises a voltage divider having a selectively variable output voltage, an A/D converter for converting said output voltage into digital cursor position data signals for energizing said selected cursor cell.

12. A programmable control system for supplying electrical data signals for the construction of an article of manufacture, said system including display means comprising an array of electrically energizable display cells for visually displaying data signals as a configuration of the article to be constructed, a cursor circuit for energizing a selected cell in the array as a position display cursor cell, means for preselecting article configuration data, means for converting said data into article configuration data signals, means for storing said article configuration data signals, means for energizing cells in the array in the vicinity of said cursor cell in response to said stored configuration data signals, and means for causing shifting of the energized display cursor cell to a new position to deenergize said article configuration cells in the array while maintaining energization of the cell representing the new cursor position.

13. The system of claim 12; comprising means for automatically reenergizing said article configuration cells in the array when the position of the energized cursor cell remains unchanged.

14. A system for visually displaying the configuration of an article of manufacture in response to electrical article configuration data signals; said system comprising an array of electrically energizeable display cells, means for selecting article configuration data signals, configuration data memory means for storing said data signals, virtual memory means for receiving said data signals from said configuration data memory means and for transmitting the data for energizing corresponding cells, a cursor position control, cursor circuit means providing cursor position data in response to said control for energizing a selected cell in the array, cursor position memory means for storing said cursor position data, logic means for receiving data from both said article configuration data memory means and said cursor position memory means and for transferring the data to said virtual memory means, said logic means including comparison means for sending article configuration data to said virtual memory means when said cursor position data remains unchanged, said logic means transferring only cursor position data to said virtual memory means when said cursor position data is changing.

15. A system for visually displaying the configuration of an article of manufacture in response to electrical article configuration data signals; said system comprising two arrays of electrically energizeable article configuration display cells, two serial input, parallel output shift register means, each shift register means having its parallel outputs connected to one array of said cells, a central processing unit, means for entering selected configuration data signals into said unit; said unit having independent random access memory means for storing configuration data signals for each array of cells, said unit having data transfer memory means for receiving configuration data from either of said independent memory means; said unit having means for connecting said transfer data memory means to either of said shift register means inputs; means for selecting an independent random access memory means in said unit, means for causing the configuration data in the selected independent memory means to be transferred to said transfer memory means for transfer to the input of either shift register means and means for selecting one shift register means for energizing cells in one of said arrays.

16. An article configuration display system comprising:

- a row of electric display cells with each cell representing a fractional length of the length of the row,
- means for selectively lighting spaced groups of cells in the row for representing both article positions and article widths at said positions along the row,
- means for lighting a cursor cell at a selected position along the row of cells,
- means for lighting selected groups of cells at selected positions of said lighted cursor cell, and
- selective clearing means for selectively darkening lit cells in a group of cells at the position of said lighted cursor cell while leaving other groups of lit cells illuminated,
- wherein said selective clearing means also darkens all lit group cells in the row which are at one side of said cursor cell.

17. An article configuration display system comprising:

- a row of electric display cells,
- means for lighting a cell as a cursor cell at any selected position along said row,
- means for lighting a group of cells to form a row of lit cells of a selected length in the vicinity of the lighted cursor cell,
- means for darkening previously lighted cells in the row except the cursor cell during a change in cursor cell position, and
- means for relighting said darkened rows of cells when the lighted cursor cell is stationary.

18. A display and control system for displaying deck board position data and deck board width data of both the upper and lower sides of a pallet and for supplying said data to a pallet nailing machine; said system comprising:

- two rows of electric display cells each displaying deck board data for one side of a pallet,
- means for supplying data for energizing said cells to represent both pallet deck board width and board position in each row, means for lighting a cell as a cursor cell at any selected position along either row, means for lighting a group of cells to form a row of lit cells of a selected length in the vicinity of the lighted cursor cell, means for darkening previously lighted cells in either row except the cursor cell during a change in cursor cell position, means for relighting said darkened rows of cells when the lighted cursor cell is stationary, means for selecting one row of cells for display, means for supplying data to the selected row, means for selecting the other row of cells for display while leaving the cells in said one row energized, means for supplying data to said other row, and means for supplying data as to which cells of either row are energized to a pallet nailing machine.

19. A method of providing article configuration data for the control of an article manufacturing machine, said method comprising the steps of:

lighting a cursor display cell at a selected position in an array of cells with a first control for displaying article position along the array, lighting a row of display cells in said array adjacent the position of said lighted cursor cell with a second control for displaying an article dimension along the array, storing data corresponding to the positions in the array of the lighted article dimension cells for controlling an article manufacturing machine, temporarily darkening all cells in the array except the cursor cell during a period when the position of the cursor cell in the array is being changed, and relighting the previously darkened cells in the array when the position of the cursor cell is stationary.

* * * * *

UNITED STATES PATENT AND TRADEMARK OFFICE
CERTIFICATE OF CORRECTION

PATENT NO. : 4,491,829

DATED : January 1, 1985 PAGE 1 of 2

INVENTOR(S) : Louis S. McTamaney

It is certified that error appears in the above-identified patent and that said Letters Patent is hereby corrected as shown below:

Column 4, Line 64, "Board" should read --board--.

Column 5, Line 1, after "step" insert --,-- (comma).

Column 5, Line 59, "configutation" should read --configuration--.

Column 6, Line 38, after "cells" delete --B3-- (second occurrence).

Column 9, Line 52, change " "update Display" " to --"Update Display"--.

Column 10, Line 15, "inter-relation," should read --interrelation,--.

Column 11, Line 11, "ram" should read --RAM--.

Column 13, Line 55, after "at" insert --block--; after "152b" delete --block--.

UNITED STATES PATENT AND TRADEMARK OFFICE

CERTIFICATE OF CORRECTION

PATENT NO. : 4,491,829
DATED : January 1, 1985
INVENTOR(S) : Louis S. McTamaney

It is certified that error appears in the above-identified patent and that said Letters Patent is hereby corrected as shown below:

Column 14, Line 7, "outputed" should read --outputted--.

Column 15, Line 23, after "QH" delete --by--.

Column 18, Line 19, "O's" should read --0's--.

Column 19, Line 8, " "0-4"" " should read --"0-4"--.

Column 21, Line 33, "energizable" should read --energizeable--.

Signed and Sealed this

*Fifteenth* Day of *October 1985*

[SEAL]

*Attest:*

DONALD J. QUIGG

*Attesting Officer*

*Commissioner of Patents and Trademarks—Designate*